United States Patent [19]

Matyas et al.

[11] 4,218,738

[45] Aug. 19, 1980

[54] METHOD FOR AUTHENTICATING THE IDENTITY OF A USER OF AN INFORMATION SYSTEM

[75] Inventors: Stephen M. Matyas; Carl H. W. Meyer, both of Kingston, N.Y.

[73] Assignee: International Business Machines Corporation, Armonk, N.Y.

[21] Appl. No.: 903,286

[22] Filed: May 5, 1978

[51] Int. Cl.² .......................... G06F 3/00; H04K 1/00
[52] U.S. Cl. ..................................... 364/200; 178/22; 340/149 A
[58] Field of Search ... 364/200 MS File, 900 MS File; 235/379, 380, 382, 487; 340/149 A, 152 R, 534, 535, 345; 178/22, 37, 89; 358/259; 179/2 CA

[56] References Cited

U.S. PATENT DOCUMENTS

| | | | |
|---|---|---|---|
| 3,594,727 | 7/1971 | Braun | 179/2 CA |
| 3,624,357 | 11/1971 | Wright | 340/149 A |
| 3,764,742 | 10/1973 | Abbott et al. | 364/200 |
| 3,798,359 | 3/1974 | Feistel | 364/200 |
| 3,798,605 | 3/1974 | Feistel | 364/200 |
| 3,958,081 | 5/1976 | Ehrsam et al. | 364/200 |
| 3,962,539 | 6/1976 | Ehrsam et al. | 364/200 |

OTHER PUBLICATIONS

Feistel, "Cryptography and Computer Privacy," *Scientific American*, vol. 228, No. 5, May 1973, pp. 15-23.
Feistel et al., "Some Cryptographic Tech. for Machine to Machine Data Comm.," *Proc. of IEEE*, vol. 63, No. 11, Nov. 1975, pp. 1545-1554.
Diffie et al., "New Directions in Cryptography," *IEEE Trans. on Information Theory*, Nov. 1976, pp. 644-654.

*Primary Examiner*—Leo H. Boudreau
*Attorney, Agent, or Firm*—Edwin Lester

[57] ABSTRACT

Secure hardware is provided for cryptographically generating a verification pattern which is a function of a potential computer user's identity number, the potential computer user's separately entered password, and a stored test pattern. The test pattern for each authorized computer user is generated at a time when the physical security of the central computer and its data can be assured, such as in a physically guarded environment with no teleprocessing facilities operating. Secure hardware for generating verification patterns during authentication processing and for generating test patterns during the secure run is disclosed which uses a variation of the host computer master key to reduce risk of compromise of total system security. The use of a variant of the host master key prevents system programmers and/or computer operators from compromising the integrity of the authentication data base by, for example, interchanging entries and/or inserting new entries.

24 Claims, 20 Drawing Figures

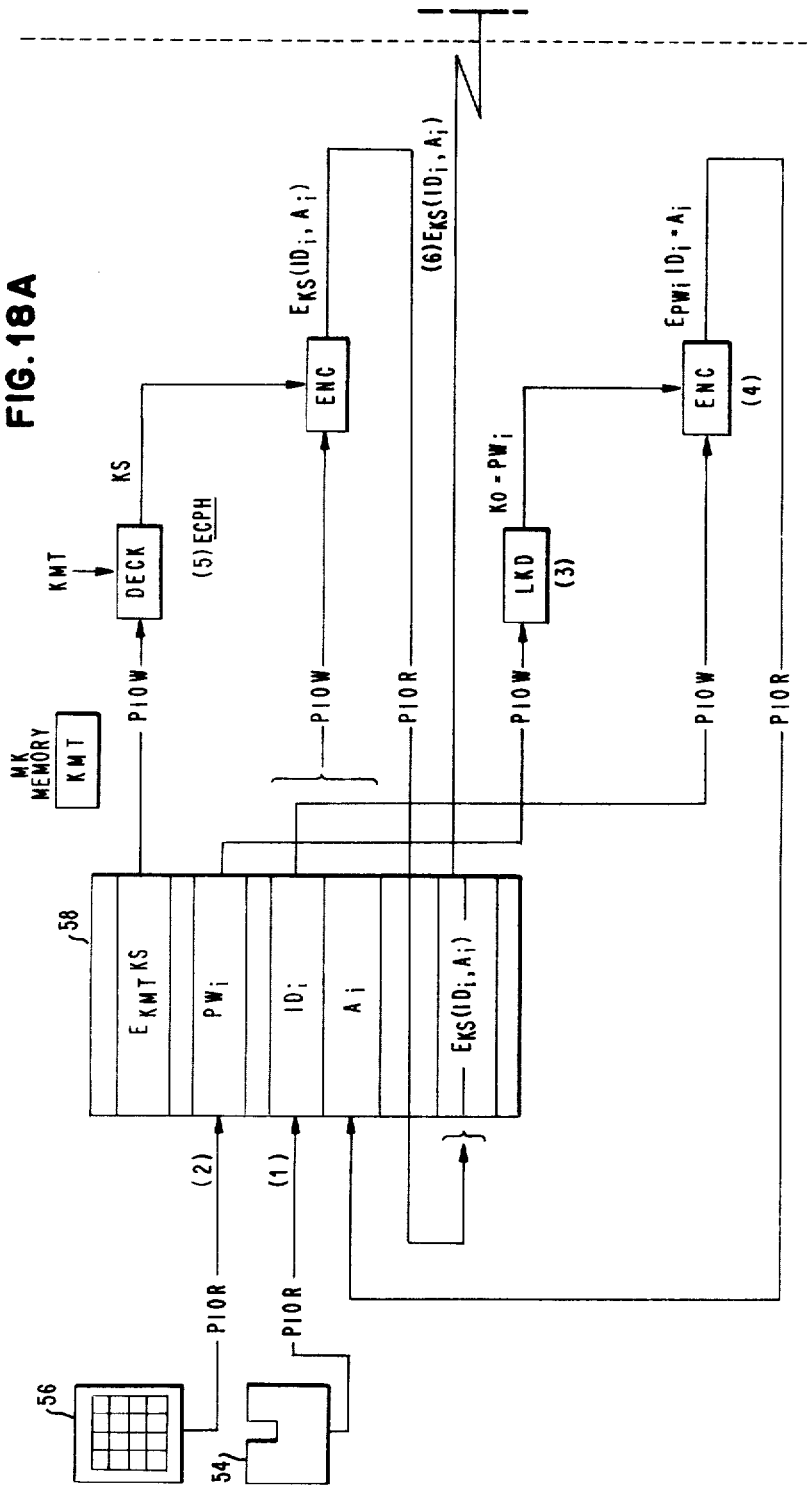

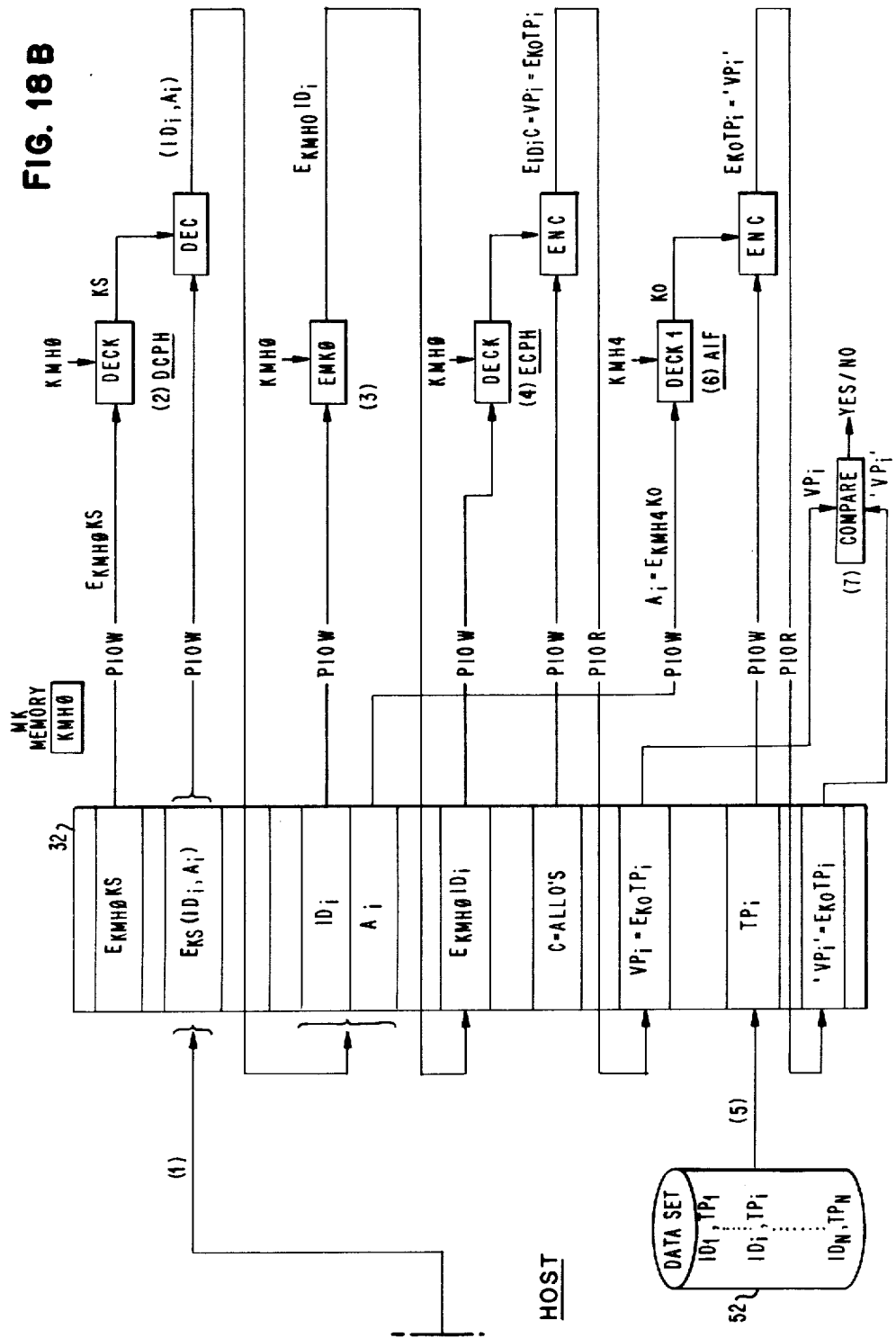

METHOD FOR AUTHENTICATING THE IDENTITY OF A USER OF AN INFORMATION SYSTEM

FIELD OF THE INVENTION

This invention relates to a method for authenticating the identity of a consumer or a potential computer user based upon comparison of information submitted by the potential user with information stored in the computer system.

CROSS REFERENCE TO RELATED APPLICATIONS

This application is related to the following patent applications which are assigned to the same assignee as the patent application:
1. "Cryptographic Communication and File Security Using Terminals", Ser. No. 857,533, filed Dec. 5, 1977, by Ehrsam et al.
2. "Cryptographic Communication Security for Single Domain Networks", Ser. No. 857,532, filed Dec. 5, 1977, by Ehrsam et al.

BACKGROUND OF THE INVENTION

This invention relates to cryptographic security techniques and, more particularly, to an arrangement for authenticating the identity of a terminal user provided with an identification number and a secret password.

Identifying numbers such as account numbers and identification cards such as charge cards and employee identification cards bearing the identification number of the person being identified have been used for some time as a means for accessing data bases. To the extent that the identification number and identification card can be secured from third parties, the identification card itself provides authenticating evidence tending to verify that the holder is the person authorized to access the data base. In view of the fact that a person's charge account number is often embossed on the identification card, however, and the fact that an identification card or credit card can easily be lost or copied, the evidentiary value of an identification card is quite limited. Supplemental evidence that the person who is presenting an identification card is the person authorized to hold the card and obtain access to the data base is often presented in the form of a memorized password or other authenticating information obtainable only from the authorized card holder, such as a digitized fingerprint, voice print, or dynamic signature analysis information. It is known in the prior art to encrypt the password or other authenticating information (either in a reversible or irreversible mode) and store the encrypted authenticating information in a data base accessible by the identification number for comparison with a password provided by a potential computer user.

A serious exposure of these known table look-up identity verification methods is that a hostile system programmer or computer operator may be able to interchange the encrypted authenticating information for his own account with that of the encrypted authenticating information for another's account and thereby gain access to the other person's account by giving his own password to the system. After gaining access to the other person's account, the encrypted authenticating information records could be returned to their authorized position to cover the tracks of the illicit transaction.

Another exposure of the simple table look-up methods of the prior art is that simple cryptographic functions are utilized. For example, the characteristic identifying information is encrypted for storage and decrypted for comparison with authenticating information submitted at a terminal. Alternately, the encrypted authenticating information may be stored and authenticating information encrypted at a terminal may be transmitted directly to the host computer for direct comparison. In either event, it is possible for hostile persons to create new accounts with associated passwords and obtain the encrypted form of the password at a terminal which will be stored in the data base table for later use in attacking a data base such as might be owned by a bank. Thus, the resources of the institution owning the computer would be exposed to attack as well as individual accounts or data sets within the data base as previously described.

Accordingly, it is an object of the invention to provide a secure method of authenticating the identity of a user of an information system.

Another object of the invention is to provide a secure method for protecting authentication information used to verify the identity of a potential user of an information system.

A further object of the invention is to provide authentication patterns at a host data processing system for the users of the system each being a cryptographic function of a user identification number and a secret password.

Still another object of the invention is to provide verification patterns at the host data processing system for the users of the system each being a cryptographic function of a predetermined number and the user identification number.

Still a further object of the invention is to provide a table of user test patterns at the host data processing system for the users of the system each being a cryptographic function of the corresponding user authentication pattern and verification pattern.

Still another object of the invention is to provide a table of user test patterns by an irreversible cryptographic function.

Still a further object of the invention is to provide user test patterns by a cryptographic function using a variant of the system master key.

Still another object of the invention is to provide a user authentication pattern at a terminal of the system which is a cryptographic function of the user identification number and a secret password.

Still a further object of the invention is to provide a first verification pattern at the host system which is a cryptographic function of a predetermined number and the user identification number provided at the terminal and transferred to the host system.

Still another object of the invention is to provide a second verification pattern at the host system which is a cryptographic function of the user authentication pattern provided at the terminal and transferred to the host system and the user test pattern accessed from the table of user test patterns.

Still a further object of the invention is to provide the second verification pattern by an irreversible cryptographic function.

Still another object of the invention is to provide the second verification pattern by a cryptographic function using a variant of the system master key.

A data communication system in accordance with the invention includes one or more terminals operatively coupled to a host data processing system each having cryptographic apparatus for cryptographic data communications. In order to authenticate the identity of terminal users of the system, a host system initialization process is first performed to provide a table of test patterns for use during subsequent authentication processing. This is accomplished by providing terminal user identification numbers and passwords and a predetermined number at the host data processing system. A first initialization operation is performed at the host data processing system in accordance with the terminal user identification numbers and passwords to obtain terminal user authentication patterns. A second initialization operation is performed at the host data processing system in accordance with the predetermined number and the terminal user identification numbers to obtain terminal user first verification patterns. A third initialization operation is performed at the host data processing system in accordance with the terminal user authentication patterns and the terminal user first verification patterns to obtain the table of terminal user test patterns.

During authentication processing, a terminal user identification number and password are provided by a user at a terminal of the system. An operation is performed at the terminal in accordance with the terminal user identification number and password to obtain a terminal user authentication pattern. The terminal user identification number and authentication pattern is then transferred to the host data processing system to carry out an authentication process. At the host data processing system, a first operation is performed in accordance with the predetermined number and the received terminal user identification number to obtain a terminal user first verification pattern. The table of terminal user test patterns is then accessed in accordance with the received terminal user identification number to provide the test pattern corresponding to the terminal user. A second operation is performed at the host data processing system in accordance with the accessed terminal user test pattern and terminal user authentication pattern to obtain a terminal user second verification pattern. The first verification pattern is then compared with the second verification pattern to authenticate the identity of the terminal user.

The foregoing and other objects, features and advantages of the invention will be apparent from the following particular description of the preferred embodiment of the invention, as illustrated in the accompanying drawings.

BRIEF DESCRIPTION OF THE DRAWINGS

FIG. 18 is a diagram of how FIGS. 18A and 18B may be placed to form a detailed schematic diagram.

FIGS. 18A and 18B, taken together, comprise a detailed schematic diagram of an embodiment of a data communication system arrangement of the present invention illustrating the process of authenticating the identity of a user of the system.

GENERAL DESCRIPTION

Introduction

Figure 1:
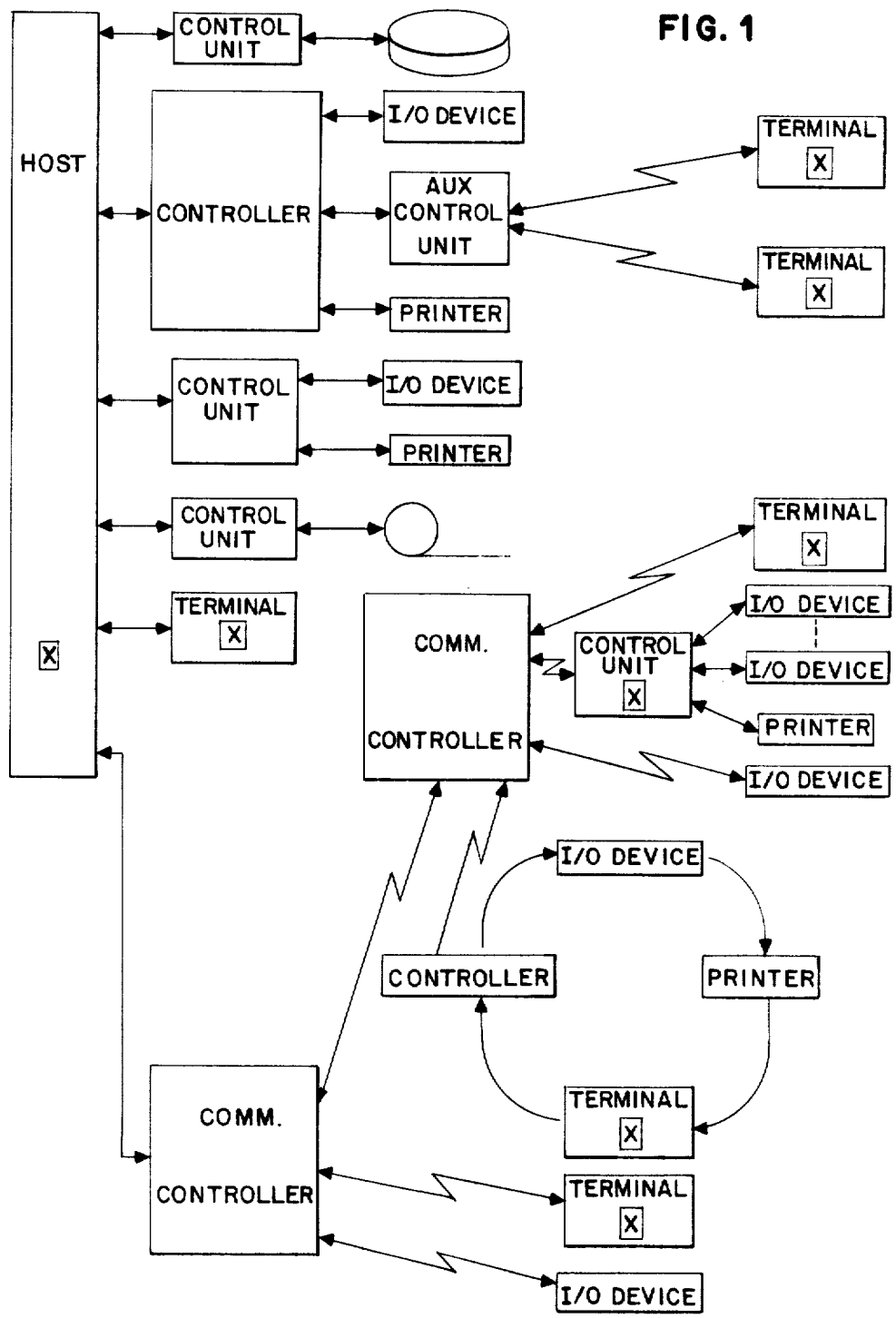
FIG. 1 is a block diagram illustrating a cryptographic data communication system.

Modern day information systems may include a complex of communication terminals connected via communication lines to a host data processing system and its associated resources such as host programs, and locally attached terminals and secondary data files. Because of the complexity and increasing size of such systems, it is recognized that data within the system and transmitted between various elements of the system must be protected against unauthorized disclosure, destruction and modification. The scope of such protection must necessarily include security against the adversary who deliberately attempts to gain unauthorized access to protected resources of the system.

Authentication is the process which proves or serves to prove that a user of the system is the person authorized to obtain access to the system. Typically, authentication of a user requires a special test of legitimacy. An early form of such test arose with the advent of identification cards such as credit cards bearing an identification number ID of the person being identified for access to the system. The card would be read by a card reader at an input of the system and compared with a table of ID values to authenticate the potential user of the system. However, this test has limited value in view of the fact that the ID is often embossed and that the card can easily be lost or copied. Accordingly, to provide more secure authentication, it became necessary to provide additional evidence that the person presenting an ID card is the person authorized to hold the card and obtain access to the information system. This was accomplished by providing the authorized user of the system with a memorized password PW for entry into the system along with the user ID. A table of valid passwords is stored at the host data processing system and accessible by the user ID. In this authentication arrangement, the ID card is read at an input terminal of the system and the memorized PW is also manually entered, the combination being transmitted to the host system. At the host system, the stored PW is accessed from the table on the basis of the user ID and then compared with the PW received from the terminal to authenticate the user of the system.

Another form of user authentication is presently available when the terminals and the host system each have cryptographic capabilities. Thus, in such a system, the table of PW's may be replaced by a table of numbers each of which is a cryptographic function of the PW so that PW's need never appear in clear form. In this authentication arrangement, the user ID and PW are entered at a terminal having a cryptographic facility where the PW can be protected using a cryptographic function after which the user ID and enciphered PW are transferred to the host system. At the host system, the stored cryptographic function of PW is accessed from the table on the basis of the user ID and then compared with the cryptographic function of PW received from the terminal to authenticate the user of the system.

A serious exposure of these known table look-up identity verification methods is that an adversary may be able to skillfully modify information in the verification table. Thus, if an opponent were able to create $\phi(X)$ for an arbitrary value of X where $\phi$ is a cryptographic function, and replace $\phi(PW_i)$ with $\phi(X)$ in the verification table, then by inputting X at the terminal, entry to the system under $ID_i$ could be achieved. Also, an opponent who is a legitimate user, e.g., $ID_j$, of the system could gain entry under a different identifier, e.g. $ID_i$, by replacing $\phi(PW_i)$ with $\phi(PW_j)$. In either situation, once entry to the system is achieved, $\phi(PW_i)$ could be put back into the verification table to prevent detection. In authentication arrangements which use password verification, a mechanism is needed which prevents an opponent from successfully attacking the system through skillful modification of the verification table. This is accomplished in the present invention via a high integrity cryptographic authentication technique using special test patterns generated from the system master key which will be described in greater detail hereafter.

Referring now to FIG. 1, there is illustrated a representative data communication system which includes a variety of terminals having a cryptographic facility and a host data processing system having a cryptographic facility.

Most practical cryptographic arrangements require two basic elements, namely (1) a cryptographic algorithm which is a set of rules that specify the steps required to transform or encipher plaintext into ciphertext or to transform or decipher ciphertext back into plaintext and (2) a cipher key. The cipher key is used to select one out of many possible relationships between the plaintext and the ciphertext. Various cryptographic algorithms have been developed in the prior art for improving data security in data processing systems. One such algorithm is described in U.S. Pat. No. 3,958,081 issued May 18, 1976 and was recently adopted as a United States Federal Data Processing Standard as set forth in detail in the Federal Information Processing Standard publication, Jan. 15, 1977, FIPS PUB 46. The cryptographic algorithm operates to transform or encipher a 64 bit block of plaintext into a unique 64 bit block of ciphertext under control of a 56 bit cipher key or to transform or decipher a 64 bit block of ciphertext back into an original 64 bit block of plaintext under control of the same 56 bit cipher key with the deciphering process being the reverse of the enciphering process. The effectiveness of this cipher process depends on the techniques used for the selection and management of the cipher key used in the cipher process. The only cipher key actually used in the cipher process to personalize the algorithm when encrypting or decrypting data or other keys is termed the working key and is accessible only by the cryptographic apparatus. All other keys hereafter discussed are used at different times as working keys depending upon the cipher operation to be performed.

There are basically two categories of cipher keys used in the cryptographic system, namely, operational keys (KO) which are data encrypting keys used to encrypt/decrypt data and key encrypting keys (KEK) which are used to encrypt/decrypt other keys. The data encrypting or operational class of cipher keys which protects data during data communication sessions between a remote terminal and host system is a key called the primary communication key. It is a system generated, time variant, dynamically created key transmitted in enciphered form under a key encrypting key from a host system to a remote terminal. The key is deciphered at the terminal and then loaded into the working key register and used as the working key. The key exists only for the duration of the communication session and will be referred to as the system session key (KS). Within the key encrypting category of cipher keys, there are two sub-categories, namely, the primary key encrypting key and the secondary key encrypting key. The primary key encrypting key is used in the host system to encipher other keys and is called the system key. It is used to protect the system session keys actively used at the host and will be referred to as the host master key (KMH). The secondary key encrypting key is a secondary communication key which is used to protect other keys. This key is used to protect system session keys transmitted to a terminal and will be referred to as the terminal master key (KMT).

GENERATION, DISTRIBUTION, INSTALLATION AND MANAGEMENT OF CRYPTOGRAPHIC KEYS

Key generation is the process which provides for the creation of the cipher keys required by a cryptographic system and includes the specification of a system master key and primary and secondary communication keys.

The host master key is the primary key encrypting key and is the only cipher key that needs to be present in the host cryptographic facility in clear form. Since the host master key does not generally change for long periods of time, great care must be taken to select this key in a random manner. This may be accomplished by using some random experiment such as coin tossing where bit values 0 and 1 are determined by the occurrence of heads and tails of the coin or by throwing dice where bit values 0 and 1 are determined by the occurrence of even or odd rolls of the dice, with the occurrence of each group of coins or dice being converted into corresponding parity adjusted digits. By enciphering all other cipher keys stored in or passed outside the host system, overall security is enhanced and secrecy for such other cipher keys reduces to that of providing secrecy for the single host master key. Secrecy for the host master key may be accomplished by storing it in a non-volatile master key memory so that the host master key need only be installed once. Once installed, the master key is used only by the cryptographic apparatus for internally deciphering enciphered keys which may then be used as the working key in a subsequent encipher/decipher operation.

Installation of the host master key may be accomplished by a direct manual entry process using mechanical switches, dials, or a hand-held key entry device. Alternately, an indirect entry method may be used in which case the host master key may be entered from a non-volatile media such as a magnetic card or tape which is maintained in a secure location (safe, vault, etc.) accessible only to the security administrator. Another alternative indirect entry method may be to use a keyboard entry device, though this method is subject to human error. In any event, whichever indirect method is chosen, during initialization, the host master key may be read into and temporarily stored in the host memory and then transferred to the master key memory with the host memory entry being subsequently erased so that only one copy is present and accessible only by the cryptographic facility.

The terminal master key is a secondary key encrypting key and like the system master key, is the only key encrypting key that needs to be present in clear form in the terminal cryptographic facility. Since there may be numerous terminals associated with a host system, it may not be practical or prudent to have these keys generated by a human user using some type of random experiment. Therefore, to relieve the system administrator from the burden of creating cryptographic keys, except for the single system master key, the cryptographic apparatus of the host system can be used as a pseudo random generator for generating the required terminal master keys used by the various terminals associated with the host system. The manner by which such host system generated random numbers are produced is described in greater detail in the aforementioned application Ser. No. 857,532, entitled "Cryptographic Communication Security for Single Domain Networks". The terminal master key is retained in enciphered form at the host in a manner as described in the aforementioned patent application and the clear form of the system generated terminal master key is distributed in a secure manner to the authorized terminal users. This may be accomplished by transporting the key by courier, registered mail, public telephone, etc. The likelihood of an opponent obtaining the key during transit can be lessened by transmitting different portions of the key over independent paths and then combining them at the destination. Once having properly received a valid system or private generated terminal master key in clear form, it becomes necessary to maintain its secrecy. At the terminal, this is accomplished by writing the terminal master key into a non-volatile master key memory, as in the case of the host system master key. Once installed, the terminal master key is used only by the terminal cryptographic apparatus for internally deciphering enciphered system generated session keys which may then be used as the working key in a subsequent encipher/decipher operation.

System generated primary communication keys, i.e. session keys, are time variant keys which are dynamically generated for each communication session and are used to protect communicated data. Since there may be numerous communication sessions it is impractical to have these keys generated by a human user. Therefore, the cryptographic apparatus of the host system may be used as a pseudo-random generator for generating, as each communication session is required, a pseudo-random number which, in keeping with the objective that cryptographic keys should never occur in the clear, may be defined as being a session key enciphered under the host key encrypting key. By a technique described in the aforementioned application Ser. No. 857,532, the enciphered terminal master key and the enciphered session key are processed by a function which produces the session key enciphered under the terminal master key. This quantity is then communicated to the terminal where it is deciphered thereby allowing the host and terminal to communicate using the common session key.

DATA COMMUNICATION SYSTEM

Figure 2:
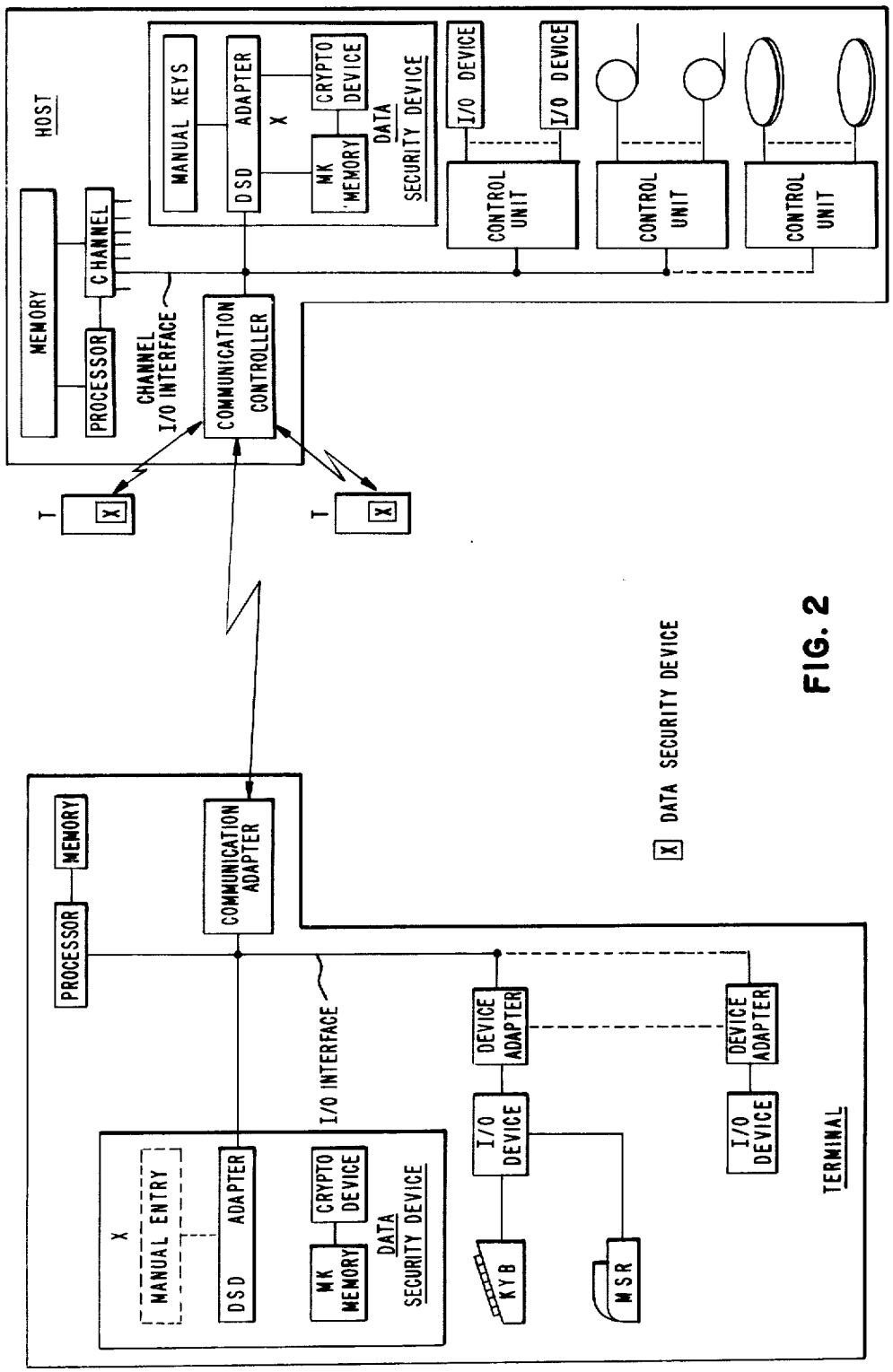
FIG. 2 is a block diagram of a representative system illustrating, in block form, the details of a host and terminal in such a system.

Modern day data communication systems may include a complex of communication terminals connected via communication lines to a single host and its associated resources such as the host programs and locally attached terminals and data files. A representative system is shown in FIG. 2 with the host and its associated resources shown in block form and a representative one of the plurality of remote communication terminals also shown in block form. The terminal and its integrated data security device (DSD) and the manner in which the data security device performs cryptographic operations is described in detail in the aforementioned application Ser. No. 857,533. Likewise, the host system and its integrated data security device (DSD) and the manner in which the data security device performs cryptographic operations is described in detail in the aforementioned application Ser. No. 857,532. While the particular manner in which the terminal and the host is implemented is not critical to the present invention, the block diagram in FIG. 2 shows the data flow and control relationships of a representative terminal and host arrangement.

The crypto device is the heart of the terminal and host DSD for performing enciphering and deciphering operations and is identical for both units. The crypto device performs encipher/decipher operations on a block cipher basis in which a message block of 8 data bytes (64 bits) is enciphered/deciphered under control of a 56 bit cipher working key to produce an enciphered/deciphered message block of 8 data bytes. The block cipher is a product cipher function which is accomplished through successive applications of a combination of non-linear substitutions and transpositions under control of the cipher working key. Sixteen operation defined rounds of the product cipher are executed in which the result of one round serves as the argument of the next round. This block cipher function operation is more fully described in the aforementioned U.S. Pat. No. 3,958,081. A basic encipher/decipher operation of a message block of data starts with the loading of the cipher key from the terminal or host memory. This key is generally stored under master key encipherment to conceal its true value. Therefore, it is received as a block of data and deciphered under the master key to obtain the enciphering/deciphering key in the clear. The clear key does not leave the crypto device but is loaded back in as the working key. The message block of data to be enciphered/deciphered is then transferred to the crypto device and the cipher function is performed, after which the resultant message block of enciphered/deciphered data is transferred from the crypto device to the terminal or host memory. If subsequent encipher/decipher functions are to be performed using the same working key, there is no need to repeat the initial steps of loading and deciphering the working key as it will still be stored in the working key register.

Figure 3:
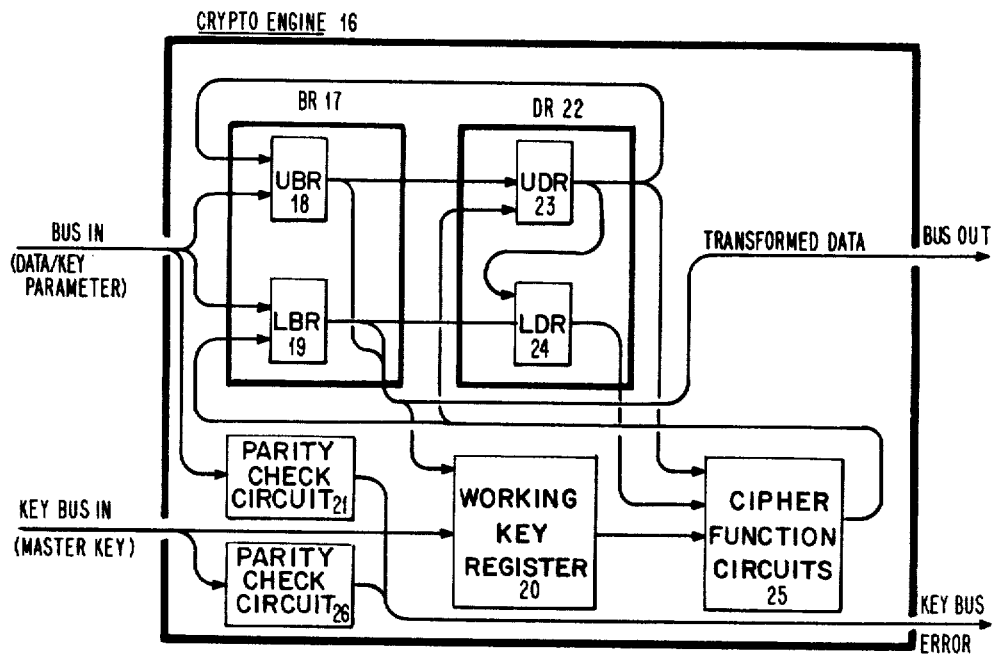
FIG. 3 is a block diagram of a cryptographic engine which performs cryptographic functions in a logically and physically secure manner.

Referring now to FIG. 3, the crypto engine 16 is shown in simplified block form with a heavy lined border signifying a secure area. The crypto engine 16 contains a 64 bit input/output buffer register 17 divided into upper and lower buffer registers 18 and 19 of 32 bits each. The buffer register 17 is used in a mutually exclusive manner for receiving input data on a serial by byte basis from the bus in, termed an input cycle, and for providing output data in a serial by byte basis to the bus out, termed an output cycle. Thus, during each input cycle a message block of eight data bytes is written into the buffer register 17 from the terminal or host memory while during each output cycle a message block of eight processed data bytes is read from the buffer register 17 to the terminal or host memory. Serial outputs of the buffer register 17 are also applied as serial inputs to the working key register 20 and a parity check circuit 21, the latter being controlled to be effective only when a 64 bit clear cipher key is to be loaded directly into the working key register 20 from the terminal or host memory via the buffer register 17. Only 56 of the 64 bits are stored in the working key register 20, the 8 parity bits being used only in the purity check circuit 21. The buffer register 17 is also provided with parallel input and output paths from and to a 64 bit data register 22 also divided into upper and lower data registers 23 and 24 of 32 bits each. The upper and lower data registers 23 and 24 each possesses parallel outputs and two sets of parallel inputs. The parallel inputs to the lower data register 24 being from the lower buffer register 19 and the upper data register 23 while the parallel inputs to the upper data register being from the upper buffer register 18 and from the lower data register 24 after modification by the cipher function circuits 25. The 64 bit master key is inputted to the crypto engine 16 on a serial by byte basis with each byte being checked for correct parity by the parity check circuit 26. As in the case of the cipher key transfer from the buffer register 17 to the working key register 20, only 56 of the 64 bits are stored in the key register 20, the 8 parity bits being used only in the parity check circuit 26. During the loading process, the key register 20 is configured as seven 8-bit shift right registers to accommodate the eight 7-bit bytes received from the MK memory 13 (or the buffer register 16).

When the working key is used for enciphering, the key register 20 is configured as two 28 bit recirculating shift left registers and the working key is shifted left, in accordance with a predetermined shift schedule, after each round of operation of the cipher function so that no set of key bits once used to perform a cipher operation is used again in the same manner. Twenty-four parallel outputs from each of the two shift registers (48 bits) are used during each round of the encipher operation. The shift schedule provided is such that the working key is restored to its initial beginning position at the end of the complete encipher operation.

When the working key is used for deciphering, the key register 20 is configured as two 28 bit recirculating shift right registers and the working key is shifted right in accordance with a predetermined shift schedule, after each round of operation of the cipher function so that again no set of key bits is used again. As in the enciphering operation, twenty-four parallel outputs from each of the two shift registers (48 bits) are used during each round of the decipher operation. The shift schedule provided in this case is also such that the working key is restored to its initial beginning position at the end of the complete decipher operation.

The cipher function circuits 25 perform a product cipher through successive application of a combination of non-linear substitutions and transpositions under control of the cipher working key. Sixteen rounds of the product cipher are executed in which the results of one round serves as the argument of the next round. Deciphering is accomplished by using the same key as for enciphering but with the shift schedule for shifting the key being altered so that the deciphering process is the reverse of the enciphering process, thus undoing in reverse order every step that was carried out during the enciphering process. During each round of the cipher function, the data contents of the upper data register 23, designated R, is enciphered under control of the working key, designated K, with the result being added modulo-2 to the contents of the lower data register 24, designated L, the operation being expressed as $L \oplus f(R,K)$. At the end of the cipher round, the contents of the upper data register 23 is parallel transferred to the lower data register 24 while the output of the cipher function circuits 25 is parallel transferred to the upper data register 23 to form the arguments for the next round of the cipher function. After a total of sixteen rounds, which completes the total cipher function, the contents of the upper data register 23 is parallel transferred to the upper buffer register 18 while the output of the cipher function circuits 25 is parallel transferred to the lower buffer register 19. The transformed data contents of the buffer register 17 is then outputted via the bus out to the terminal or host memory. Descriptions of the terminal DSD and the host DSD and the manner in which cryptographic functions are performed are described in greater detail in the aforementioned applications Ser. Nos. 857,533 and 857,532, respectively.

DSD COMMANDS AND ORDERS

Input/output operations of an I/O device are generally directed by the execution of I/O instructions. In executing an I/O instruction, the processor in the case of terminals and the channel in the case of host systems generally provides an address field for addressing the I/O device, a command field for designating the operation to be performed and another address field for addressing the data field in memory from which data is fetched or to which data is stored.

The terminal and host data security devices are responsive to a variety of commands as described in the aforementioned applications Ser. Nos. 857,533 and 857,532. However, for the purposes of the present invention the only commands used are (1) the PIO Write Data (PIOW) command which causes a data field to be loaded into the buffer register of the crypto device or the bits 0, 1, 2 and 3 of the data field to be stored in the MK memory when writing a master key therein (2) the PIO Read Data (PIOR) command which causes the contents of the buffer register of the crypto device, with correct parity, to be read out and passed via a data bus into the terminal or host memory and (3) the Write DSD Order (WR DSD) command which designates cipher key handling and data processing orders. The subset of orders capable of being performed by a terminal and a host system are different, with the host system having a larger repertoire mainly because of the fact that key management functions are limited to host system control. The variety of orders capable of being performed by a terminal and host system and the manner in which they are carried out are fully described in the aforementioned applications Ser. Nos. 857,533 and 857,532. However, for the purposes of the present invention, there is a limited number of orders used which can be commonly performed by either the terminal DSD or the host DSD. These include (1) the Write Master Key order (WMK) which is used to control writing a master key into the MK memory (2) the Decipher Key order (DECK) which is used to control a decipher operation to decipher an operational key which is enciphered under a master key under control of the master key (3) the Encipher order (ENC) which is used to control the encipherment of data under control of a working key and (4) the Decipher (DEC) order which is used to control the decipherment of enciphered data under control of a working key. In addition to these commonly performed orders, the terminal DSD also performs one other unique order, namely, the Load Key Direct order (LKD) which is used to control loading an operational key directly into the crypto engine as a working key. Also, in addition to the commonly performed orders, the host DSD performs another group of unique orders. These include (1) the Decipher Key 1 order (DECK 1) which is a new order provided for the purposes of the present invention and is used to control a decipher operation to decipher an operational key which is enciphered under a variant of the host master key (2) the Generate Random Number order (GRN) which is used to control the encipherment of a count value under control of a variant of the host master key to define a random number and (3) the Encipher Master Key order (EMK$\phi$) which is used to control the encipherment of an operational key under control of the host master key.

DSD FUNCTIONS

DSD cryptographic functions may be performed by combinations of the previously defined commands or by a combination of functions. These functions require an input to the cryptographic apparatus consisting of a key parameter or a data parameter. The notation used to describe these functions will be expressed as follows:
FUNCTION[KEY PARAMETER]→OUTPUT or
FUNCTION[DATA PARAMETER]→OUTPUT
and when functions are combined, the notation used to describe the combined functions will be expressed as follows:
FUNCTION[KEY PARAMETER, DATA PARAMETER]→OUTPUT The salient characteristics of host cryptographic functions are that (1) the key parameter, is always in enciphered form and therefore must be internally deciphered by the crypto engine before the clear key is used and that (2) no function allows keys to become available in clear form. The descriptions that follow describe what each function does and how it is performed. These functions, except for the DECK 1 function and combined functions which utilize the DECK 1 function, which will be described in greater detail hereafter, are described in greater detail in the aforementioned applications Ser. Nos. 857,533 and 857,532 but the general description of these functions or combination of functions are given at this point to provide a better understanding of how the authentication arrangement of the present invention is carried out. The descriptions may follow along with reference to FIG. 3 at times. In the diagrams which are referenced in the following, the cryptographic facility is shown in simplified block form for ease of understanding these operations.

Figure 4:
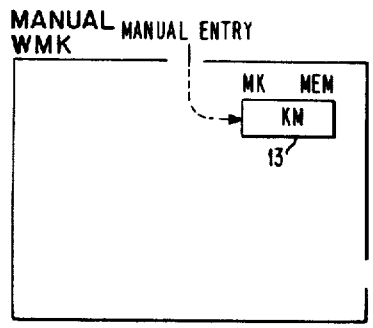
FIG. 4 illustrates in block diagram form a manual WMK function.

Before proceeding to the descriptions of the functions, a brief general description will be given of how the manual write master key (WMK) operation is performed. Referring now to FIG. 4, there is shown a simplified block diagram of a manual WMK operation. In the manual WMK operation, an enable write EW switch is set on to enable writing into the MK memory 13 after which a manual write MW switch is closed to enable manual writing and causing the current master key to be overwritten with whatever happens to be set in the data key entry switches. Following this, 16 sets of 4 bits (64 bits) are manually written into the MK memory 13 as the new master key to complete the manual WMK operation.

Figure 5:
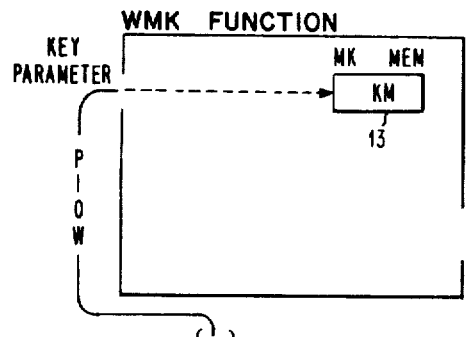
FIG. 5 illustrates in block diagram form a processor controlled WMK function.

Referring now to FIG. 5, there is shown a simplified block diagram of a write master key (WMK) function. This function is carried out by the following sequence of commands: (1) WMK and (2) 16 PIOW's. In this operation, as in the manual WMK operation, the EW switch is previously set on to enable writing into the MK memory 13. The execution of this function causes the current master key in the master key memory 13 to be overwritten with whatever happens to be present as bits 0, 1, 2 and 3 on the bus in. Thereafter, the crypto engine controls are set to allow a 64 bit master key KM to be written as a key parameter into the MK memory 13 by means of 16 successive PIOW data commands with the bits 0, 1, 2 and 3 in the data fields associated with the 16 PIOW data commands constituting the new master key. The notation WMK[KM]→KM is used to describe this operation whereby the term WMK indicates the function, the contents of the brackets indicate the key parameter input to the MK memory 13 and the arrow points to the result.

Figure 6:
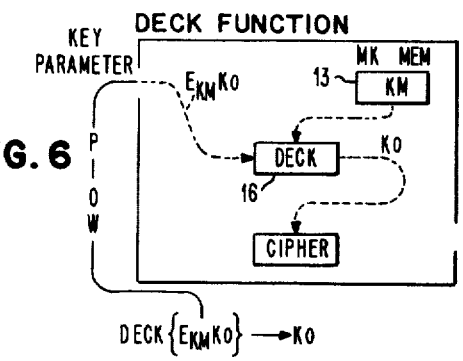
FIG. 6 illustrates in block diagram form a DECK function.

Referring now to FIG. 6, there is shown a simplified block diagram of a decipher key DECK function. This function is carried out by the following sequence of commands: (1) DECK and (2) 8 PIOW's. The execution of this function sets the crypto engine controls to first allow the master key KM in the MK memory 13 to be transferred to the crypto engine 16 as the working key. After or during the master key transfer, a 64 bit data block, defined as an operational key enciphered under the master key, is loaded as a key parameter into the crypto engine 16 by means of 8 successive PIOW data commands with the successive data fields associated with the 8 PIOW commands constituting the enciphered operational key. After the key parameter loading is completed, the crypto engine 16 performs a decipher operation to obtain the cipher key in clear form. The resultant clear cipher key does not leave the crypto engine 16 but is loaded back into the key register of the crypto engine 16 replacing the master key as the working key. The notation DECK[$E_{KM}KO$]→KO is used to describe this operation whereby the term DECK indicates the function, the contents of the bracket indicate the key parameter which is inputted to the crypto engine 16 and the arrow points to the result.

Figure 7:
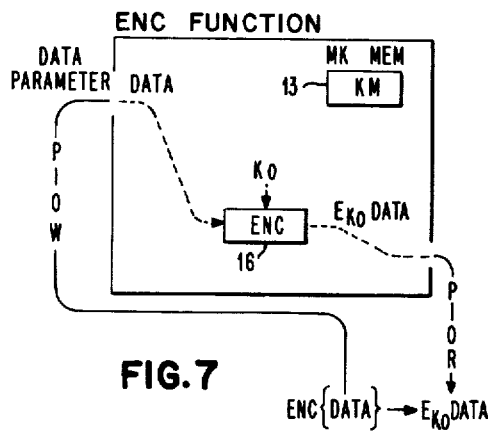
FIG. 7 illustrates in block diagram form a ENC function.

Referring now to FIG. 7, there is shown a simplified block diagram of an encipher (ENC) function. This function is carried out by the following sequence of commands: (1) ENC (2) 8 PIOW's and (3) 8 PIOR's. The execution of this function sets the crypto engine controls to the encipher mode of operation and allows a 64 bit message block of data to be loaded as a data parameter into the crypto engine 16 by means of 8 successive PIOW data commands with the successive data fields associated with the 8 PIOW commands constituting the message block of data to be enciphered. After the data parameter loading is completed, the crypto engine 16 performs an encipher operation to encipher the data parameter under the operational key presently stored in the working key register of the crypto device 16. The 64 bit enciphered result is transferred by a series of 8 PIOR commands from the crypto engine 16 for storage in designated data fields of the terminal or host memory. The notation ENC[DATA]→$E_{KO}$DATA is used to describe this operation whereby the term ENC indicates the function, the contents of the bracket indicate the data parameter input to the crypto engine 16 and the arrow points to the result.

Figure 8:
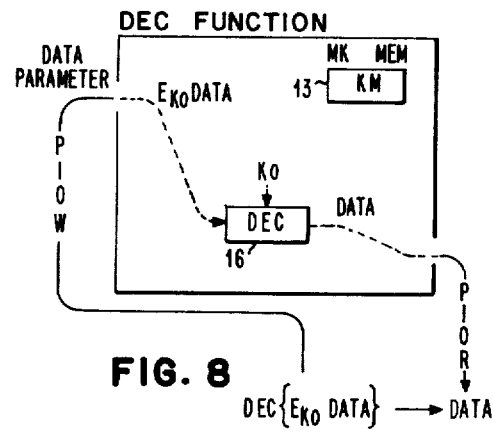
FIG. 8 illustrates in block diagram form a DEC function.

Referring now to FIG. 8, there is shown a simplified block diagram of a decipher (DEC) function. This function is carried out by the following sequence of commands: (1) DEC (2) 8 PIOW's and (3) 8 PIOR's. The execution of this function sets the crypto engine controls to a decipher mode of operation and allows a 64 bit message block of enciphered data to be loaded as a data parameter into the crypto engine 16 by means of 8 successive PIOW data commands with the successive data fields associated with the 8 PIOW commands constituting the message block of enciphered data to be deciphered. After the data parameter loading is completed, the crypto engine 16 performs a decipher operation to decipher the data parameter under control of the operational key presently stored in the working key register of the crypto engine 16. The 64 bit deciphered result is transferred by a series of 8 PIOR commands from the crypto engine 16 for storage in designated data fields of the terminal or host memory. The notation DEC[$E_{KO}$DATA]→DATA is used to describe this operation whereby the term DEC indicates the function, the contents of the bracket indicate the data parameter input to the crypto engine 16 and the arrow points to the results.

Figure 9:
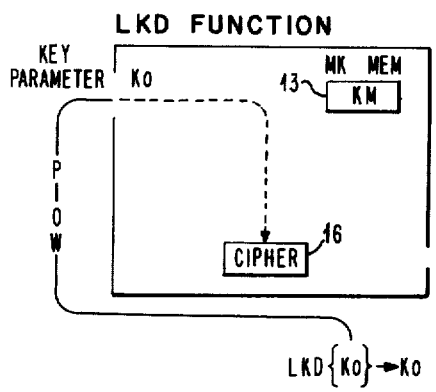
FIG. 9 illustrates in block diagram form a LKD function.

Referring now to FIG. 9, there is shown a simplified block diagram of a load key direct (LKD) function. This function is carried out by the following sequence of commands: (1) LKD and (2) 8 PIOW's. The execution of this function sets the crypto controls to allow a 64 bit operational key KO to be loaded directly as a key parameter into the crypto engine 16 by means of successive PIOW data commands with the successive data fields associated with the 8 PIOW data commands constituting the new operational key. Within the crypto engine 16, the operational or data encrypting key is loaded into the buffer register 17 and then transferred to the working key register 20 as shown in FIG. 3. The notation LKD[KO]→KO is used to describe this operation whereby the term LKD indicates the function, the contents of the bracket indicate the key parameter input to the crypto engine 16 and the arrow points to the result.

Figure 10:
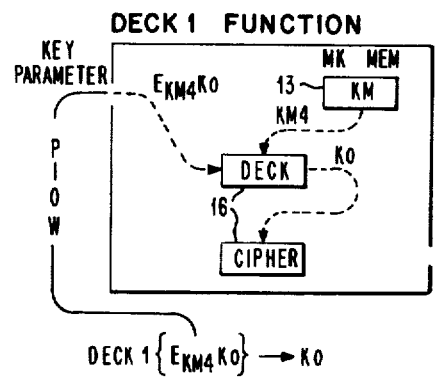
FIG. 10 illustrates in block diagram form a DECK 1 function.

Referring now to FIG. 10, there is shown a simplified block diagram of a decipher key 1 DECK 1 function. This function is carried out by the following sequence of commands: (1) DECK 1 and (2) 8 PIOWs. The execution of this function sets the crypto engine controls to first allow a variant KM4 of the master key KM in the MK memory 13 to be transferred to the crypto engine 16 as the working key, the variant KM4 being obtained by inverting predetermined bits of the master key. After or during the master key transfer a 64 bit block of data, defined as an operational key enciphered under the variant of the master key, is loaded as a key parameter into the crypto engine 16 by means of 8 successive PIOW data commands with the 8 PIOW commands constituting the enciphered operational key. After the key parameter loading is completed, the crypto engine 16 performs a decipher operation to obtain the cipher key in clear form. The resultant clear cipher key does not leave the crypto engine 16 but is loaded back into the key register of the crypto engine 16 replacing the variant of the master key as the working key. The notation DECK1[$E_{KM4}$KO]→KO is used to describe this operation whereby the term DECK1 indicates the function, the contents of the bracket indicate the key parameter which is inputted to the crypto engine 16 and the arrow points to the result.

Figure 11:
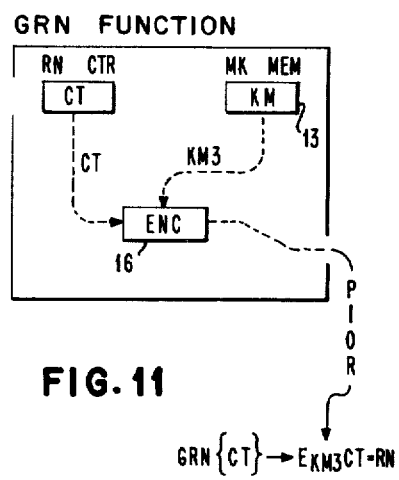
FIG. 11 illustrates in block diagram form a GRN function.

Referring now to FIG. 11, there is shown a simplified block diagram of a generate random number (GRN) function. This function is carried out by the following sequence of commands (1) GRN and (2) 8 PIORs. Accordingly, in executing this function, the crypto engine controls are set to the encipher mode of operation and a variant KM3 of the master key KM in the MK memory 13 is transferred to the crypto engines 16 as the working key, the variant KM3 being obtained by inverting predefined bits of the master key which are different from those used in the DECK1 function. During the transfer of the master key variant KM3 to the crypto engine 16, a 64 bit count value CT from a non-resettable RN counter is loaded as a data parameter into the crypto engine 16. After the key and the data parameter loading is completed, the RN counter is stepped by one and the crypto engine 16 performs an encipher operation to encipher the data parameter CT under control of the variant KM3 of the master key presently stored in the working key register of the crypto device 16. The 64 bit enciphered result is a pseudo random number RN which is transferred by a series of 8 PIOR commands from the crypto engine 16 for storage in designated data fields of the host memory for use as a password in the authentication arrangement of the present invention in a manner which will be described hereafter. The notation GRN[CT]→RN($E_{KM3}$CT) is used to describe this operation whereby the term GRN indicates the function, the contents of the bracket indicates the data parameter input to the crypto engine 16 and the arrow points to the result.

Figure 12:
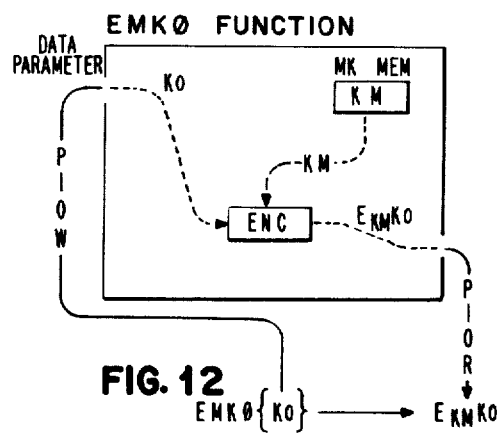
FIG. 12 illustrates in block diagram form an EMK$\phi$ function.

Referring now to FIG. 12, there is shown a simplified block diagram of the encipher master key (EMKφ) function. This function is carried out by the following sequence of commands (1) EMKφ (2) 8 PIOWs and (3) 8 PIORs. Accordingly, in executing this function, the crypto engine controls are set to the encipher mode of operation causing the unmodified master key in the MK memory 13 to be transferred to the crypto engine 16 as the working key. After or during the master key transfer, a 64 bit data block, defined as an operational key, is loaded as a data parameter into the crypto engine 16 by means of 8 successive PIOW data commands with successive data fields associated with the 8 PIOW commands constituting the operational key. After the key and data parameter loading is completed, the crypto engine 16 performs an encipher operation to encipher the data parameter under the master key stored in the working key register of the crypto device 16. The 64 bit enciphered result is transferred by a series of 8 PIOR commands from the crypto engine 16 for storage in designated data fields of the host memory. The notation EMKφ[KO]→$E_{KM}$KO is used to describe the EMKφ operation whereby the terms EMKφ indicates the function, the contents of the bracket indicate the data parameter input to the crypto engine 16 and the arrow points to the results.

Figure 13:
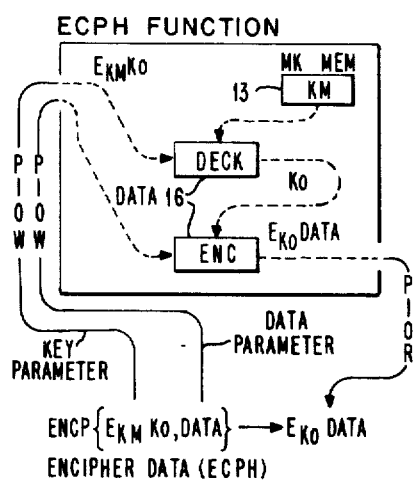
FIG. 13 illustrates in block disgram form a ECPH function.

Referring now to FIG. 13, there is shown a simplified block diagram of an encipher data (ECPH) function. This function is a combination of the DECK function and the ENC function and is carried out by the following sequence of commands (1) DECK (2) 8 PIOWs (3) ENC (4) 8 PIOWs and (5) 8 PIORs. Accordingly, in executing this function, the crypto engine controls are first set to the decipher key mode of operation by the DECK command causing the master key KM in the master key memory 13 to be transferred as the working key to the working key register of the crypto engine 16. After or during the master key loading, the key parameter of the function, consisting of an operational key enciphered under the master key, is loaded into the crypto engine 16 by means of 8 successive PIOW data commands. The crypto engine 16 then performs a decipher key operation to obtain the operational key in clear form which is then loaded back in as the working key of the crypto engine 16 replacing the previously loaded master key. The crypto engine controls are then set to an encipher mode of operation by the ENC command and the data parameter of the function, consisting of clear data, is loaded into the crypto engine 16 by means of 8 successive PIOW data commands. The crypto engine 16 then performs an encipher operation to encipher the data parameter under the present operational key. The enciphered result is then transferred by a series of 8 PIOR commands from the crypto engine 16 for storage in designated fields of the terminal or host memory. The notation ECPH[$E_{KM}$KO,DATA]-→$E_{KO}$DATA is used to describe this operation whereby the term ECPH indicates the function, the contents of the bracket indicate the successive key parameter and data parameter inputs to the crypto engine and the arrow points to the result.

Figure 14:
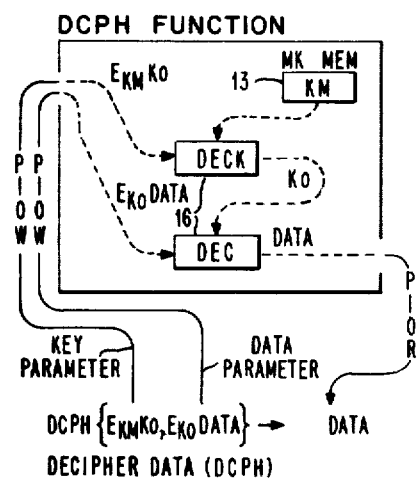
FIG. 14 illustrates in block diagram form a DCPH function.

Referring now to FIG. 14, there is shown a simplified block diagram of a decipher data (DCPH) function. This function is a combination of the DECK function and the DEC function and is carried out by the following sequence of commands: (1) DECK (2) 8 PIOWs (3) DEC (4) 8 PIOWs and (5) 8 PIORs. The first part of this function is identical to that for the encipher function ECPH insofar as loading an operational key in clear form as the working key of the crypto engine 16. After the operational key loading is completed, the crypto engine controls are then set to a decipher mode of operation by the DEC command and the data parameter of the function, consisting of DATA enciphered under the operational key, is loaded into the crypto engine 16 by means of 8 successive PIOW data commands. The crypto engine 16 then performs the decipher operation to decipher the data parameter under control of the present operational key. The deciphered result is then transferred by a series of 8 PIOR commands from the crypto engine 16 for storage in designated fields of the terminal or host memory. The notation DCPH [$E_{KM}$KO,$E_{KO}$DATA]→DATA is used to describe this operation whereby the term DCPH indicates the function, the contents of the bracket indicate the successive key parameter and the data parameter inputs to the crypto engine and the arrow points to the result.

Figure 15:
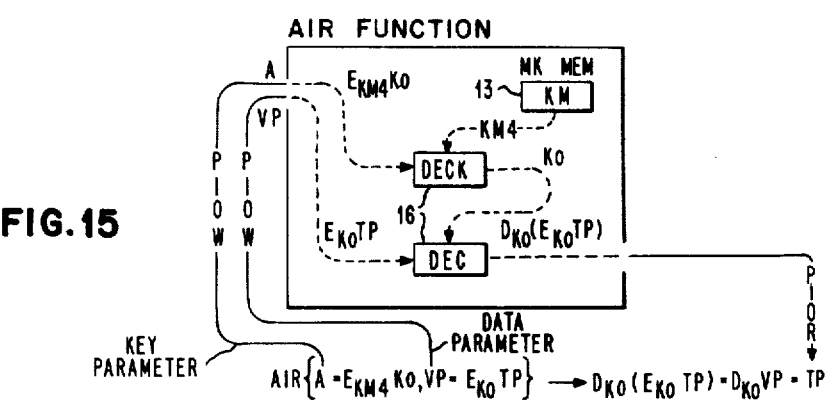
FIG. 15 illustrates in block diagram form a AIR function.

Referring now to FIG. 15, there is shown a simplified block diagram of the privileged authenticating identity reverse (AIR) function. This function is carried out by the following sequence of commands: (1) DECK 1, (2) 8 PIOWs, (3) DEC, (4) 8 PIOWs and (5) 8 PIORs. Accordingly, in executing this function, the crypto engine controls are first set to the decipher key mode of operation by the DECK1 command causing the fourth variant (KM4) of the master key KM stored in the master key memory 13 to be transferred as the working key to the crypto engine 16. After or during the master key variant loading, the key parameter of the function, consisting of an authentication pattern defined as a (fictitious) operational key enciphered under the fourth variant of the master key, is loaded into the crypto engine 16 by means of 8 successive PIOW data commands. The crypto engine 16 then performs a decipher key operation to obtain the operational key in clear form. The clear operational key is then loaded as the new working key into the crypto engine 16 replacing the previously loaded variant of the master key. The crypto engine controls are then set to a decipher mode of operation by the DEC command and the data parameter of the function, consisting of a verification pattern defined as a test pattern enciphered under the operational key, is loaded into the crypto engine 16 by means of 8 successive PIOW data commands. The crypto engine 16 then performs a decipher operation to decipher the data parameter under control of the operational key. The result is the decipherment, under the operational key, of the test pattern enciphered under the operational key. Since the test pattern enciphered under the operational key is also equal to the verification pattern, the result may alternatively be defined as the decipherment under the operational key of the verification pattern. In either event, the deciphered result is the test pattern in clear form. The deciphered result is then transferred by means of 8 successive PIOR commands from the crypto engine 16 for storage in designated fields of the host memory. The notation AIR[A, VP]→TP is used to describe this function whereby the term AIR indicates the function, the contents of the bracket indicated the key parameter and data parameter inputs to the crypto engine and the arrow points to the result.

Figure 16:
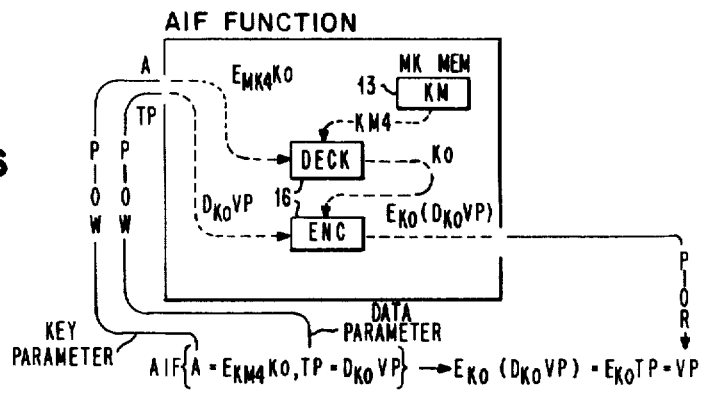
FIG. 16 illustrates in block diagram form a AIF function.

Referring now to FIG. 16, there is shown a simplified block diagram of the operating authenticating identity forward function (AIF). This function is carried out by the following sequence of commands: (1) DECK1, (2) 8 PIOWs, (3) ENC, (4) 8 PIOWs and (5) 8 PIORs. The first part of this function is identical to that for the AIR function insofar as loading an operational key in clear form as the working key of the crypto engine 16. The crypto engine controls are then set to an encipher mode of operation by the ENC command and the data parameter of the function, consisting of the test pattern defined as the verification pattern deciphered under the operational key, is loaded into the crypto engine 16 by means of 8 successive PIOW data commands. The crypto engine 16 then performs an encipher operation to encipher the data parameter under control of the operational key. The result is the encipherment, under the operational key, of the verification pattern deciphered under the operational key. Since the verification pattern deciphered under the operational key is also equal to the test pattern, the result may alternatively be defined as the encipherment under the operational key of the test pattern. In either event, the enciphered result is the verification pattern in clear form. The enciphered result is then transferred by means of 8 successive PIOR commands from the crypto engine 16 for storage in designated fields of the host memory. The notation AIF [A,TP]→VP is used to describe this function whereby the term AIF indicates the function, the contents of the bracket indicate the key parameter and data parameter inputs to the crypto engine and the arrow points to the result.

COMMUNICATION SECURITY

In a data communication system where terminals are local to the host system, as where the terminals are cable connected to the host system in adjacent rooms or on adjacent floors of the same building and such cables are not accessible to unauthorized persons, data may be transferred between the terminals and the host system in clear form. However, where the terminals are remote from the host system and data must be transferred over communication lines, it is necessary to employ cryptographic techniques to provide communication security for data communication sessions between the host system and such remote terminals. One such an arrangement for providing communication security is fully described in the aforementioned application Ser. No. 857,532. Briefly, this is accomplished by establishing a common session or operational key at both the host system and the communicating terminal in order to permit data enciphered at the terminal under control of the common operational key at the terminal to be communicated over a communication line to the host system where it may be deciphered under control of the common operational key at the host system to obtain the terminal data in clear form at the host system. In order to establish the common session or operational key at both the remote terminal and the host system, a protocol is provided by which a random number is generated at the host system and is defined as being the session key enciphered under the host master key $E_{KMH\phi}KS$. This value is retained at the host system and is deciphered by a DECK function to obtain the session key in clear form as a working key to permit enciphering/deciphering data operations at the host system. By a technique described in the aforementioned application Ser. No. 857,532, the enciphered session key is processed by a function which produces the session key enciphered under the terminal master key $E_{KMT}KS$. This enciphered quantity can then be securely communicated to the terminal and deciphered by the DECK function to obtain the session key in clear form as a working key to permit enciphering/deciphering data at the terminal. Having established the common session or operational key at both the terminal and the host system, it allows the terminal and the host system to securely communicate data using the common session key.

DETAILED DESCRIPTION OF THE INVENTION

Figure 17:
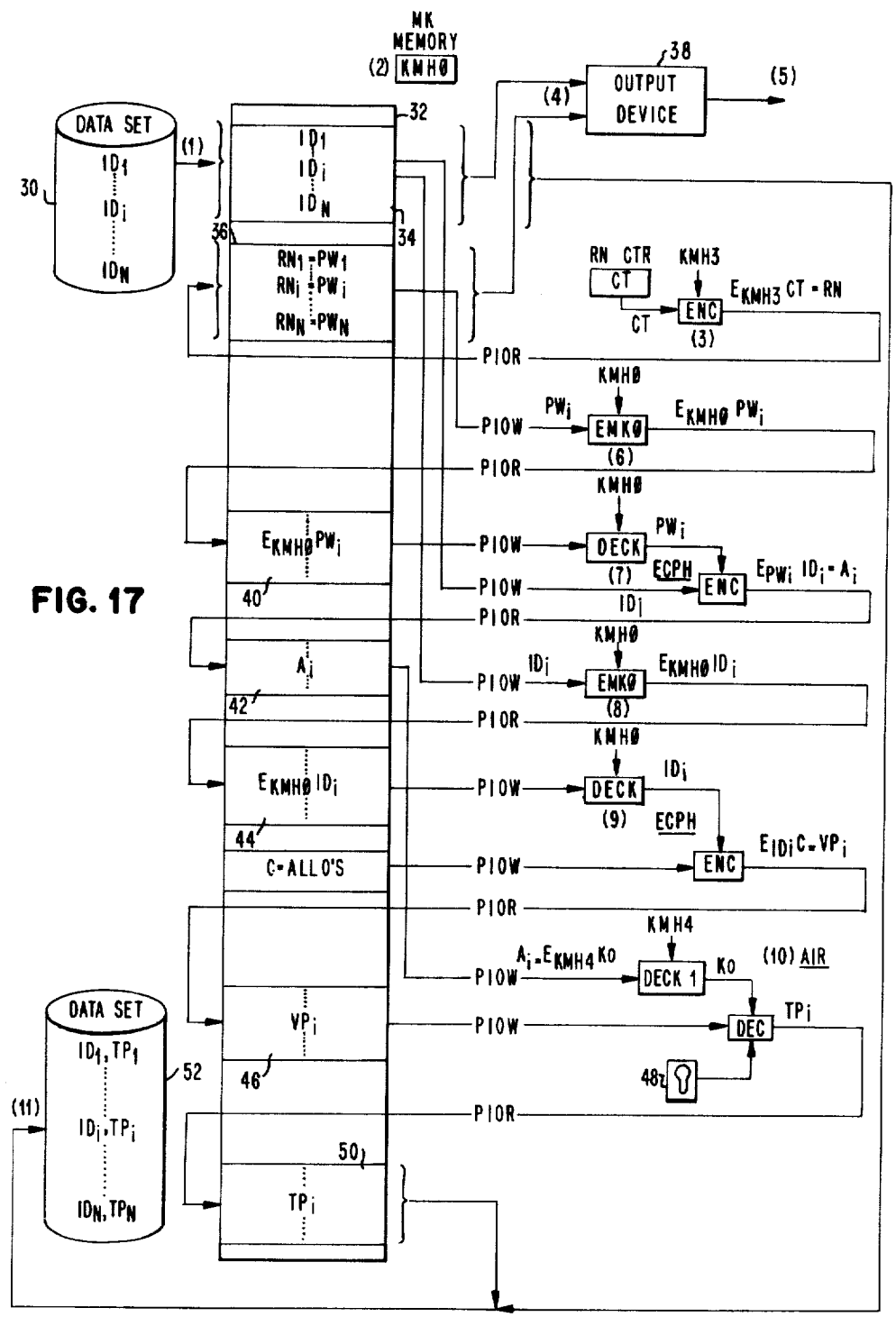
FIG. 17 comprises a detailed schematic diagram of an embodiment of the host system arrangement of the present invention illustrating the process for providing user test patterns for the authentication process.

Referring now to FIG. 17, there is shown a block diagram of the arrangement at the host system for creating a table of user test patterns which are subsequently used during authentication processing. Simplified block diagrams are used to illustrate the various cryptographic operations carried out by the cryptographic facility of the host system in order to simplify and aid in the understanding of the present invention. The cryptographic facility of the host system is fully described in the aforementioned application Ser. No. 857,532.

The description which now follows is keyed to numbered notations in FIG. 17 in order further aid in understanding the sequence of operations performed in creating the table of user test patterns. Referring now to FIG. 17, (1) at host initialization time, a table of identification numbers $ID_1$-$ID_N$ such as account numbers are read from a data set storage device 30 for storage as a table 34 in the host memory 32. (2) Next, the host master key $KMH\phi$ is written into the MK memory of the host data security device by manual entry means or under program control as by executing a WMK function. (3) Following this, a series of GRN functions is performed during each of which the host DSD is set to the encipher mode of operation by the GRN command and the host master key is read out of the MK memory and selected bits inverted to provide a variant KMH3 of the host master key for transfer as the working key to the working key register of the crypto engine. Concurrently, a count value CT from a non-resettable RN counter is loaded as a data parameter into the crypto engine which then performs the encipher operation to encipher the data parameter CT under control of the variant KMH3 of the host master key to obtain the enciphered result $E_{KMH3}CT$. This enciphered result is a pseudo random number RN which may be used as an authorized password PW for a user of the system. The password is transferred by execution of a series of PIOR commands from the crypto engine for storage in the host memory 32. By repeating this process N times, a table 36 of passwords $PW_1$-$PW_N$ is provided in the host memory 32 corresponding to the table of identification numbers $ID_1$-$ID_N$ for the N users of the systems. Optionally, the users of the system may select their own passwords, each of which may be inputted to the system for storage in the host memory 32. (4) Copies of the table 34 of identification numbers $ID_1$-$ID_N$ and the corresponding table 36 of related passwords $PW_1$-$PW_N$ are read out of the host memory 32 to an output device 34 such as a printer for (5) hard copy output which may, for example, be stored in a vault for later access by officers when assigning a new account number and a corresponding related password to a new customer or for back-up purposes.

At this point, a series of sequential operations is performed to establish a series of N authentication patterns for the N users of the system. The manner in which this is accomplished will be described in terms of representative values $PW_i$ and $ID_i$, it being understood that a similar sequential operation is performed for each corresponding entry in the password and identification number tables. Accordingly, (6) a $EMK\phi$ function is first performed to encipher the password $PW_i$ under the host master key $KMH\phi$. In executing this function, the host DSD is set to the encipher mode of operation by the $EMK\phi$ command and the host master key $KMH\phi$ is read out of the MK memory and transferred as the working key to the working key register of the crypto engine. By a series of PIOW commands, the password $PW_i$ is read out of the table of passwords from the host memory 32 and loaded as a data parameter into the crypto engine. The crypto engine then performs an encipher operation to encipher the password $PW_i$ under the host master key $KMH\phi$. The enciphered result $E_{KMH\phi}PW_i$ is then transferred by a series of PIOR commands from the crypto engine for storage in a table 40 of the host memory 32.

Having enciphered the password $PW_i$ under the host master key $KMH\phi$, the password $PW_i$ can now be used as an operational key to encipher the corresponding user identification number $ID_i$ using the ECPH function to obtain the user$_i$ authentication pattern $A_i$. (7) The encipher ECPH function involves a combination of a decipher key DECK command operation followed by an encipher data ENC command operation. In executing this function, the host DDS is set to the decipher key mode of operation by the DECK command causing the host master key $KMH\phi$ to be read out of the master key memory and transferred as the working key to the working key register in the crypto engine. By a series of PIOW commands, the password $PW_i$ enciphered under the host master key i.e. $E_{KMH\phi}PW_i$ is read out of the table of enciphered passwords in the host memory 32 and loaded into the crypto engine. The crypto engine then performs a deciper key operation to obtain the password $PW_i$ in clear form as an operational key which is loaded back in the working key register of the crypto engine as the working key replacing the previously loaded host master key $KMH\phi$. The crypto engine controls are then set to an encipher data mode of operation by the ENC command and by another series of PIOW commands, the identification number $ID_i$ is read out of the table of identification numbers of the host memory 32 and loaded into the crypto engine. The crypto engine then performs the enciper data operation to encipher the user identification number $ID_i$ under the working key $PW_i$ to obtain the enciphered result $E_{PW_i}ID_i$ which is defined as the authentication pattern $A_i$ for the user$_i$. The authentication pattern $A_i$ is then transferred by a series of PIOR commands from the crypto engine for storage in the host memory 32. In a similar manner, a series of authentication patterns are created for the users of the system and are contained in a table 42 of authentication patterns.

At this point, a series of sequential operations is performed to establish a series of N verification patterns for the N users of the system. The manner in which this is accomplished will again be described in terms of a representative identification number $ID_i$, it being understood that a similar sequential operation is performed for each entry in the identification number table. Accordingly, (8) a $EMK\phi$ function is performed to encipher the identification word $ID_i$ under the host master key $KMH\phi$. In executing this function, the host DSD is set to the encipher mode of operation by the $EMK\phi$ command and the host master key $KMH\phi$ is read out of the MK memory and transferred as the working key to the working key register of the crypto engine. By a series of PIOW commands, the identification number $ID_i$ is read out of the host memory 32 and loaded as a data parameter into the crypto engine. The crypto engine then performs an encipher operation to encipher the identification number $ID_i$ under control of the host master key $KMH\phi$ to obtain the enciphered result $E_{KMH\phi}ID_i$ which is then transferred by a series of PIOR commands from the crypto engine for storage in a table 44 of the host memory 32.

Having enciphered the user$_i$ identification number $ID_i$ under the host master key $KMH\phi$, the identification number can now be used as an operational key to encipher a constant using the encipher ECPH function to obtain the user$_i$ verification pattern $VP_i$. The constant may take any form and for illustration purposes is shown consisting of all 0's.

In executing the encipher ECPH function, the host DSD is first set to the decipher key mode of operation by the DECK command causing the host master key $KMH\phi$ to be read out of the master key memory and transferred as the working key to the working key register in the crypto engine. By a series of PIOW commands, the enciphered identification number i.e. $E_{KMH\phi}ID_i$ is read out of the table of enciphered identification words in the host memory 32 and loaded as a data parameter into the crypto engine. The crypto engine then performs the decipher key operation to obtain the identification number $ID_i$ in clear form as an operational key which is loaded back in the working key register of the crypto engine as the working key replacing the previously loaded host master key $KMH\phi$. The crypto engine controls are then set to an encipher data mode of operation by the encipher data ENC command and by another series of PIOW commands, the constant C is read out of the host memory 32 and loaded as a data parameter into the crypto engine. The crypto engine then performs the encipher data operation to encipher the constant C under the working key $ID_i$ to obtain the enciphered result $E_{ID_i}C$ which is defined as the verification pattern $VP_i$ for the user$_i$. The verification pattern $VP_i$ is then transferred by a series of PIOR commands from the crypto engine for storage in the host memory 32. In a similar manner a series of verification patterns are created for the users of the system and are contained in a table 46 of verification patterns.

At this point, a series of sequential operations is performed to establish a series of N test patterns for the N users of the system. These test patterns are each produced as a cryptographic function of the user authentication pattern A, the corresponding user verification pattern VP and a variant KMH4 of the host master key. The algorithm of the cryptographic function has an irreversible property so that it is not possible (for all practical purposes) to deduce the cryptographic key used in carrying out this function from the input parameters or the enciphered result. The manner in which the user test patterns are produced will be described in terms of a representative value of the authentication pattern $A_i$ and verification pattern $VP_i$, it being understood that a similar sequential operation is performed for each corresponding entry in the authentication and verification pattern tables 42 and 46. The user test pattern is produced by carrying out the authenticating identity reverse AIR function which has been previously described in general terms and will be described in greater detail hereafter. (10) The authenticating identity reverse AIR function involves a combination of a decipher key 1 DECK 1 command operation followed by a decipher data DEC command operation. In executing this function, the host DSD is set to the decipher key mode of operation by the DECK 1 command causing the host master key to be read out of the MK memory and selected bits inverted to provide a variant KMH4 of the host master key for transfer as the working key to the working key register of the crypto engine. By a series of PIOW commands, the authentication pattern $A_i$ which may now be defined as being an operational key enciphered under the fourth variant of the host master key is read out of the table 42 of authentication patterns in the host memory 32 and loaded into the crypto engine. The crypto engine then performs a decipher key operation to decipher the authentication pattern $A_i = E_{KMH4}KO$ under control of the variant KMH4 of the host master key to obtain the operational key KO in clear form which is loaded back into the working key register of the crypto engine as the working key replacing the previously loaded variant KMH4 of the host master key. Included in the crypto engine controls is a security key lock 48 which necessitates a security officer to insert a key to actuate the crypto engine controls so as to permit a decipher data operation to be performed following the decipher key 1 operation. Any attempt to produce the test pattern without the use of physical key will force an encipher data operation to be performed resulting in an invalid test pattern; the operation of this crypto engine control will be described in greater detail hereafter. Suffice it to say, at this time, that the security officer has inserted the physical key and actuated the crypto engine controls so that the privileged AIR function may be validly performed. Accordingly, the crypto engine controls are set to a decipher data mode of operation by the DEC command and by another series of PIOW commands, the verification pattern $VP_i$, which may now be defined as the test pattern $TP_i$ enciphered under the operational key KO i.e. $E_{KO}TP_i$, is read out of the table 46 of the verification patterns in the host memory 32 and loaded into the crypto engine. The crypto engine then performs the decipher data operation to decipher the enciphered user test pattern under the working key K0 to obtain the user$_i$ test pattern $TP_i$ in clear form. The user test pattern $TP_i$ is then transferred by a series of PIOR commands from the crypto engine for storage in the table 50 of test patterns in the host memory 32. In a similar manner, a series of user test patterns are created and stored in the table 50 of the host memory 32. (11) A series of sequential operations is then performed to read out the table 34 of user identification numbers and the table 50 of user test patterns from the host memory 32 for storage in a data set storage device 52 for later retrieval by identification number whenever the identity of a user of the system is to be authenticated. At this point, since copies of the user identification numbers and passwords are stored in the vault and the user test patterns have been produced and stored in the data set storage device, there is no further need for the various tables in the host memory 32, and therefore they may be erased so that no opponent will have ready access to such information. Additionally, the security officer may reset the key lock and remove the physical key thereby inhibiting an opponent from being able to carry out the AIR function to produce a valid user test pattern.

Referring now to FIGS. 18A and 18B, there is shown a block diagram of the arrangement for authentication processing in a system containing a remote terminal connected via a communication line to a host data processing system. In order to simplify and aid in the understanding of the present invention, let it be assumed that a communication session has been established between the two units so that a common session or operational key now resides in the host memory 32 in the form $E_{KMH\phi}KS$ and that a copy of the operational key in the form $E_{KMT}KS$, which was communicated to the terminal by the host system, resides in the terminal memory 54, where $KMH\phi$ is host system master key and KMT is the terminal master key.

The description which now follows is keyed to numbered notations in the figures in order to aid in understanding the sequence of operations in carrying out the authentication processing. Referring now to FIG. 18A, (1) a magnetic stripe reading unit 54 is provided to read the identification number such as an employee number, account number and so forth which is usually carried as part of the information on the magnetic stripe of an identification or credit card. The identification number $ID_i$ read from the identification card by the magnetic stripe reader 54 is transferred by a series of PIOR commands to the terminal memory 58. (2) In addition to the magnetic stripe reader 54, a key pad 56 is provided for user entry of the password or personal identification number which has been memorized by the user as evidence of his identity. The password $PW_i$ is transferred by a series of PIOR commands to the terminal memory 58. (3) Having inputted a user identification number $ID_i$ and password $PW_i$, an authentication pattern $A_i$ can now be produced for the user. This is accomplished by loading the password $PW_i$ as a working key into the crypto engine which can then be used as an operational key to encipher the corresponding user identification number $ID_i$ with the enciphered result representing the user authentication pattern $A_i$. Therefore at this point, a load key direct LKD function is performed in order to allow the password $PW_i$ to be used as an operational key KO and be loaded directly as a key parameter into the crypto engine. In executing this function, the terminal DSD is set to the load key direct mode operation by the LKD command and the password $PW_i$ is read out of the terminal memory 58 by a series of PIOW data commands and transferred as the working key to the working key register of the crypto engine. (4) An encipher data ENC function is then performed to encipher the identification number $ID_i$ under the operational key $PW_i$ to obtain the authentication pattern $A_i$. In executing this function, the terminal DSD is set to the encipher mode of operation by the encipher data ENC command. By a series of PIOW commands, the identification number $ID_i$ is read out of the terminal memory 58 and loaded as a data parameter into the crypto engine. The crypto engine then performs an encipher data operation to encipher the identification number $ID_i$ under the password $PW_i$. The enciphered result $E_{PW_i}ID_i$ which represents the authentication pattern $A_i$ is then transferred by a series of PIOR commands from the crypto engine for storage in the terminal memory 58.

In order to transfer the user identification number $ID_i$ and authentication pattern $A_i$ from the terminal to the host data processing system in a secure manner, it is necessary to encipher this information under the common session key KS which will be recognized by the host data processing system so that it can be deciphered at the host system to provide this information in clear form at the host system. (5) The encipherment of the identification number $ID_i$ and the authentication pattern $A_i$ under the session key KS is performed by the ECPH function which involves a combination of a decipher key DECK command operation followed by an encipher data ENC command operation. Accordingly in executing this function, the terminal DSD is set to the decipher key mode of operation by the DECK command causing the terminal master key KMT to be read out of the master key memory and transferred as the working key to the working key register of the crypto engine. By a series of PIOW commands, the operational key (session key) enciphered under the terminal master key i.e. $E_{KMT}KS$, is read out of the terminal memory 58 and loaded into the crypto engine. The crypto engine then performs a decipher key operation to obtain the operational key KS in clear form which is loaded back in the working key register of the crypto engine as the working key replacing the previously loaded terminal master key KMT. The crypto engine controls are then set to an encipher data mode of operation by the ENC command and by another series of PIOW commands, the identification number $ID_i$ is read out of the terminal memory 58 and loaded into the crypto engine. The crypto engine then performs an encipher operation to encipher the identification number $ID_i$ under the working key KS to obtain the enciphered identification number. The enciphered result is then transferred by a series of PIOR commands from the crypto engine for storage in the terminal memory 58. In a similar manner, by another series of PIOW commands, the next block of data representing the authentication pattern $A_i$ is read out of the host memory 32 and loaded into the crypto engine. The crypto engine then performs another encipher data operation to encipher the authentication pattern under the working key KS to obtain the enciphered authentication pattern which is also transferred by a series of PIOR commands from the crypto engine for storage in the terminal memory 58. (6) This result shown by simplified notation $E_{KS}(ID_i, A_i)$ is now communicated from the terminal to the host system.

Referring now to FIG. 18B, (1) the received enciphered identification number and authentication pattern are stored in the host memory 32 and are deciphered by a decipher DCPH function in order to obtain these values in clear form. (2) The decipher DCPH function involves a combination of a decipher key DECK command operation followed by a decipher data DEC command operation. In executing this function, the host DSD is set to the decipher key mode of operation by the DECK command causing the host master key $KMH\phi$ to be read out of the master key memory and transferred as the working key to the working key register in the crypto engine. By a series of PIOW commands, the operational key enciphered under the host master key i.e. $E_{KMH\phi}KS$, is read out of the host memory 32 and loaded into the crypto engine. The crypto engine then performs a decipher key operation to obtain the operational key KS in clear form which is loaded back in the working key register of the crypto engine as the working key replacing the previously loaded host master key $KMH\phi$. The crypto engine controls are then set to a decipher data mode of operation by the DEC command and by another series of PIOW commands, the enciphered identification number is read out of the host memory 32 and loaded into the crypto engine. The crypto engine then performs the decipher data operation to decipher the enciphered identification number to obtain the identification number $ID_i$ in clear form. The deciphered result is then transferred by a series of PIOR commands from the crypto engine for storage in the host memory 32. In a similar manner, by another series of PIOW commands, the enciphered authentication pattern is read out of the host memory 32 and loaded into the crypto engine. The crypto engine then performs another decipher data operation to decipher the enciphered authentication pattern to obtain the authentication pattern $A_i$ in clear form. The deciphered result is then transferred by a series of PIOR commands from the crypto engine for storage in the host memory 32. It should be noted that if the terminal had been a local terminal rather than a remote terminal so that information need not be transferred over an unsecure communication line. it would not be necessary to transfer these values in enciphered form from the terminal to the host system, but instead they could have been transferred in clear form directly from the terminal to the host system assuming the cable connection between the terminal and the host system is considered to be a secure link.

At this point, an operation is performed at the host system to establish a first verification pattern for the user based on his received identification number $ID_i$. Accordingly, (3) a $EMK\phi$ function is performed to encipher the received identification number $ID_i$ under the host master key $KMH\phi$. In executing this function, the host DSD is set to the encipher mode of operation by the $EMK\phi$ command and the host master key $KMH\phi$ is read out of the MK memory and transferred as the working key to the working key register of the crypto engine. By a series of PIOW commands, the received identification number $ID_i$ is read out of the host memory 32 and loaded as a data parameter into the crypto engine. The crypto engine then performs an encipher operation to encipher the received identification number $ID_i$ under control of the host master key $KMH\phi$ to obtain the enciphered result $E_{KMH\phi}ID_i$ which is then transferred by a series of PIOR commands from the crypto engine for storage in the host memory 32. Having enciphered the received user identification number $ID_i$ under the host master key $KMH\phi$, the received identification number can now be used as an operational key to encipher the constant C using the encipher ECPH function to obtain a first version of the user verification pattern $VP_i$. (4) In executing the encipher ECPH function, the host DSD is set to the decipher key mode of operation by the DECK command causing the host master key $KMH\phi$ to be read out of the master key memory and transferred as the working key to the working key register in the crypto engine. By a series of PIOW commands, the enciphered identification number i.e. $E_{KMH\phi}ID_i$ is read out of the host memory 32 and loaded as the data parameter into the crypto engine. The crypto engine then performs the decipher key operation to obtain the received identification number $ID_i$ in clear form as the operational key which is loaded back in the working key register of the crypto engine as the working key replacing the previously loaded host master key $KMH\phi$. The crypto engine controls are then set to an encipher data mode of operation by the encipher data ENC command and by another series of PIOW commands, the constant C is read out of the host memory 32 and loaded as a data parameter into the crypto engine. The crypto engine then performs the encipher data operation to encipher the constant C under the working key $ID_i$ to obtain the enciphered result $E_{ID_i}C$ which represents a first version of the user, verification pattern $VP_i$. The verification pattern $VP_i$ which may also be defined as $E_{KO}TP_i$ is then transferred by a series of PIOR commands from the crypto engine for storage in the host memory 32. (5) Following this, the user test pattern $TP_i$ may be read into the host memory 32 from the data set storage device 52 in accordance with the user identification number $ID_i$.

At this point, an authenticating identity forward AIF function is performed to produce a second version of the verification pattern which may be compared with the first version to authenticate the identity of the user of the system. The second version of the verification pattern is produced as a cryptographic function of the received user authentication pattern $A_i$, the user test pattern $TP_i$ and a variant KMH4 of the host master key. (6) The authenticating identity forward AIF function involves a combination of a decipher key 1 DECK 1 command operation followed by an encipher data ENC command operation. In executing this function, the host DSD is set to the decipher key mode of operation by the DECK 1 command causing the host master key to be read out of the MK memory and selected bits inverted to provide a variant KMH4 of the host master key for transfer as the working key to the working key register of the crypto engine. By a series of PIOW commands, the received authentication pattern $A_i$, which may now be defined as being an operational key enciphered under the fourth variant of the host master key, is read out of the host memory 32 and loaded into the crypto engine. The crypto engine then performs a decipher key operation to decipher the authentication pattern $A_i = E_{KMH-4}KO$ under control of the variant KMH4 of the host master key to obtain the operational key in clear form which is loaded back into the working key register of the crypto engine as the working key replacing the previously loaded variant KMH4 of the host master key. The crypto engine controls are then set to an encipher data mode of operation by the ENC command and by another series of PIOW commands, the user test pattern $TP_i$ is read out of the host memory 32 and loaded into the crypto engine. The crypto engine then performs the encipher data operation to encipher the user test pattern $TP_i$ under the working key KO to obtain the enciphered result $E_{KO}TP_i$ which is equal to a second version 'VP$_i$' of the user verification pattern. This second version is then transferred by a series of PIOR commands from the crypto engine for storage in the host memory 32. (7) The host data processing system may now perform a compare operation to compare the first version $VP_i$ of the user verification pattern with the second version 'VP$_i$' of the user verification pattern to authenticate the identity of user$_i$ who is seeking access to the system.

The integrity of the authentication process is assured for the following reasons: (1) By using a special variant of the host master key, it is not possible to use other cryptographic operations, singly or in combination, to subvert the intent of the AIF and AIR functions. There are no operations which will allow encipherment or decipherment under the special variant of the host master key. The operational key KO resulting from the decipher key operation never appears in the clear outside of the crypto engine and therefore, for an arbitrary authentication pattern there is no way to determine the corresponding operational key and vice versa. (2) The AIF function allows arbitrary encipherment under the operational key KO but there is no way to decipher under KO. (3) For an arbitrary authentication pattern, the probability that the test pattern can be determined by means other than the AIR function is, for all practical purposes, limited to pure guess.

While the host data security device is shown in simplified form in FIGS. 18A and 18B, a detailed schematic diagram of the host data security device is shown in FIGS. 22a1 through 22i2 of the aforementioned application Ser. No. 857,532. Also included in that application is a detailed description of the manner in which the host data security device performs the various cryptographic operations. However, in order to execute new AIR and AIF cryptographic operations previously described, additional logic must be added to the host DSD. Therefore, to avoid unnecessary duplication, only the logic of the aforementioned application Ser. No. 857,532 which connect to the added logic are shown in FIG. 19 and the added logic is shown in bolder lines for contrast and diagonal lines through the lines to be omitted.

Figure 19:
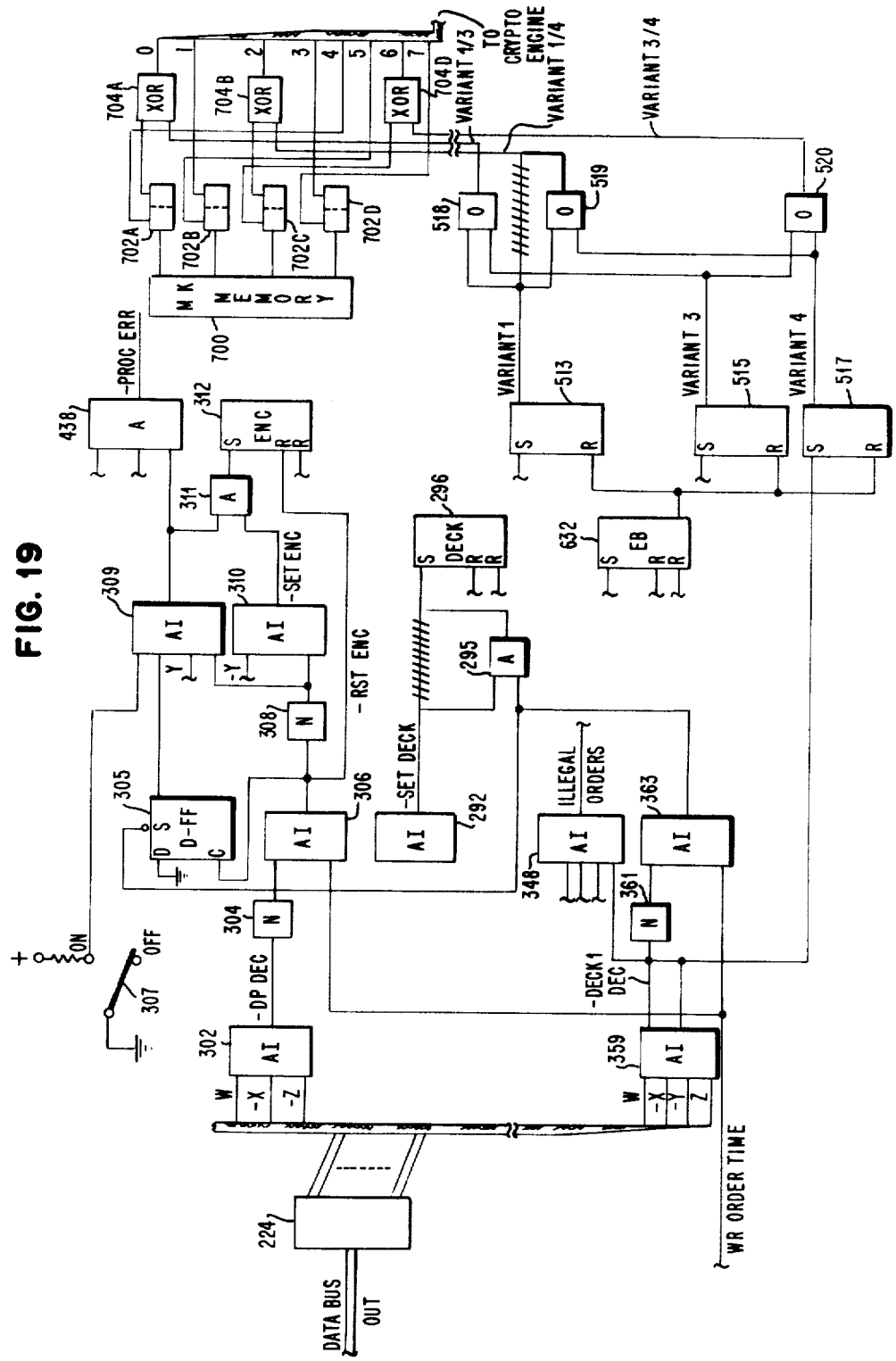
FIG. 19 comprises a detailed schematic diagram of a modified host data security device of the present invention.

Referring now to FIG. 19, the AIR function involves the execution of two cryptographic operations, namely, the decipher key 1 DECK 1 operation and the decipher data DEC operation. The I/O command byte for these operations is loaded into the command register 224 with the four low order bits designating the command as a Write DSD order command and the four high order bits (W, X, Y, Z) designating the order to be performed. The bit pattern for the DECK 1 order is $W=1$, $X=0$, $Y=0$ and $Z=1$ which is decoded by the AND invert circuit 359 to apply a negative signal via the minus DECK 1 DEC line to one input of the AND invert circuit 348 which monitors for illegal orders, to the inverter 361 where it is inverted to a positive signal and applied to one input of AND invert circuit 363 and to set the variant 4 latch 517. Subsequently, at write order time, a positive signal on the WR ORDER TIME line is applied to the other input of the AND invert circuit 363 to render it effective to produce a negative signal which is applied via the −SET DECK 1 line to one input of the AND circuit 295 and to set the D-flip flop 305. Positive signals are normally maintained at the inputs to the AND circuit 295 causing a positive signal to be maintained at the output thereof which has no effect on the DECK latch 296. However, the negative signal on the −SET DECK 1 line is effective to decondition the AND circuit 295 causing a negative signal to be applied to set the DECK latch 296 to signal a decipher key operation. With the insertion of the AND circuit 295 between the AND invert circuit 292, which is the normal path for DECK operation, and the AND invert circuit 363, which is the new path for the DECK 1 operation, and the set input to the DECK latch 296, DECK latch 296 can now be set by AND invert circuit 292 or AND invert circuit 363 in order to initiate a decipher key operation.

Heretofore, at this point in a decipher key operation, the host master key is transferred from the MK memory to the working key register of the crypto engine. This is accomplished by reading successive pairs of half bytes from the MK memory 700 which are shifted into the shift registers 702 to provide successive bytes of the host master key for the crypto engine. In a DECK form of decipher key operation, none of the variant latches 513, 515, and 517 are set and, therefore, negative signals are applied from the outputs of these latches via the OR circuits 518, 519, and 520 to the exclusive OR crcuits 704A, 704B and 704D so that bits 0, 2 and 6 of each byte of the host master key are passed in unmodified form to the crypto engine. However, in a DECK 1 form of decipher key operation, the variant 4 latch in being set applies a positive signal to the variant 4 line and via the OR circuits 519 and 520 to the variant 1/4 and variant 3/4 lines, respectively. The positive signals on the variant 1/4 and 3/4 lines are applied to the exclusive OR circuits 704B and 704D respectively which are used to invert bits 2 and 6 of each byte read out of the MK memory 700 thereby providing a variant KMH4 of the host master key KMH$\phi$ for transfer to the crypto engine. The balance of the decipher key operation is identical to that fully described in the aforementioned application Ser. No. 857,532.

After completing the DECK 1 operation portion of the AIR function, a decipher data DEC operation is next performed. The I/O command byte for this operation is loaded into the command register 224 with the four low order bits designating the command as a Write DSD command and the four high order bits W, X, Y and Z designating the order. The bit pattern W=1, X=0 and Z=0 designates the order as a data processing order with Y=1 particularizing the data processing order as a decipher data order (whereas Y=0 particularizes the data processing order as an encipher data order). Bits W, −X and −Z are decoded by the AND invert circuit 302 to apply a negative signal to the −DP DEC line where it is inverted to a positive signal and applied to one input of the AND invert signal 306. At write order time, a positive signal is applied via the WR ORDER TIME line to render the AND invert circuit 306 effective to apply a negative signal to the clock input of the D-flip flop 305, via the −RST ENC line to reset the encipher ENC latch 312 and to the inverter 308 where it is inverted to a positive signal to one input of the AND invert circuits 309 and 310. If the data processing order is the decipher order (Y=1), then a negative signal is applied to the −Y line and a positive signal to the Y line. The negative signal on the −Y line maintains the AND invert circuit 310 deconditioned so that a positive signal is maintained on the −SET ENC line to one input of the AND circuit 311. If the security officer had inserted a key in the key lock and turn ON the key 307, a negative signal is applied to decondition the AND invert circuit 309 so that a positive signal is maintained on the other input of the AND circuit 311. The positive signal inputs to the AND circuit 311 causes a positive signal to be maintained at the output thereof which has no effect on the ENC latch 312 which remains reset indicating the decipher mode of operation which may now proceed in the manner fully described in the aforementioned application Ser. No. 857,532. On the other hand, if an opponent who does not have access to the security key and therefore is not able to turn ON the key 307, then positive signals are applied from the ON position of the key 307, from the D-flip flop 305, the Y line and the inverter 308 to render the AND invert circuit 309 effective to apply a negative signal to the AND circuit 311 and the AND circuit 438. This negative signal deconditions the AND circuit 311 causing a negative signal to be applied to set the ENC latch 312 signifying an encipher data operation which, as a result, will produce an invalid user test pattern since the AIR function requires a sequence of a DECK 1 operation followed by a DEC operation rather than an ENC operation. The negative signal output from the AND invert circuit 309 also deconditions the AND circuit 438 causing a negative signal to be applied to the −PROC ERR line signifying a procedural error. The positive shift trailing edge of the negative signal from the AND invert circuit 306 applied to the clock input of the D-flip flop 305 causes the flip flop to be reset to its initial state in preparation for subsequent operations.

The authenticating identity forward AIF function involves the execution of the two cryptographic operations, namely the decipher key 1 DECK 1 operation followed by the encipher data ENC operation. The AIF function is used during authentication processing in a non-privileged operation. Therefore, this function does not require a security key controlled key lock operation and the switch 307 operated by the security key may remain in the OFF position during authentication processing. Accordingly, in executing the AIF function, the DECK 1 operation is performed in the same manner as described above in connection with the AIR function. Likewise, when executing the encipher data ENC operation, the order bit pattern W=1, X=0 and Z=0 again designates the order as a data processing order with Y=0 (−Y=+) particularizing the data processing order as an encipher data order. Bits W, −X and −Z are decoded by AND invert circuit 302 to apply a negative signal to the −DP DEC line where it is inverted to a positive signal and applied to one input of the AND invert circuit 306. The subsequently applied positive signal on the WR ORDER TIME line renders the AND invert circuit 306 effective to apply a negative signal to reset encipher ENC latch 312 and to inverter 308 where it is inverted to a positive signal and applied to one input of the AND invert circuit 310. Since the data processing order is an encipher order (Y=0), then a negative signal is applied to the Y line and a positive signal to the −Y line. The negative signal on the Y line maintains the AND invert circuit 309 deconditioned so that a positive signal is applied to one input of the AND circuit 311. The positive signal on the −Y line in combination with the positive signal from the inverter 308 causes the AND invert circuit 310 to apply a negative signal via the −SET ENC line to decondition the AND circuit 311 causing a negative signal to be applied to set the encipher ENC latch 312 signifying an encipher data operation which may now proceed in the manner fully described in the aforementioned application Ser. No. 857,532.

While the invention has been described in terms of performing an encipher operation for enciphering data by use of an encipher command and performing a decipher operation for deciphering enciphered data by use of a decipher command, it will be recognized by those skilled in the art that these are inverse functions and, therefore, are not limited to those types of operations. Thus, a decipher operation may be used to encipher data and an encipher operation may be used to decipher the enciphered data. Accordingly, the AIR function may be performed by a sequence of DECK 1 operation followed by an encipher data ENC operation while the AIF function may be performed by a sequence of a DECK 1 operation followed by a decipher data DEC operation.

Additionally, other modifications can be made by those skilled in the art without departing from the inventive concept. For example, since the algorithm used in carrying out the cryptographic functions is an irreversible cryptographic function, and since each user is given a unique password PW, then other forms of authentication patterns can be produced, as for example, $A = E_{KEY}PW$ or $E_{PW}Constant$. Also, while the constant C used in producing the verification pattern is shown as consisting of all 0's, it should be apparent that other values may be used including variable quantities such as the user identification number.

The authentication processing technique of the present invention is also applicable in multi-domain systems where cross-domain communications can be performed between a first host processing system in one domain with a second host data processing system in another domain. When a customer of one system presents his identification card and enters his password at a terminal associated with the other system, the user identification number and corresponding authentication pattern produced at the terminal may be transferred to the associated host system and then to the one host system where authentication processing may be performed to authenticate the identity of the user.

While the invention has been particularly shown and described with reference to a preferred embodiment hereof, it will be understood by those skilled in the art that several changes in form and detail may be made without departing from the spirit and scope of the invention.

Having thus described our invention, what we claim as new and desire to secure by Letters Patent is:

1. In a system providing data communication between a terminal and a host data processing system each having cryptographic apparatus for cryptographic data communications and provided with a terminal master key and a host master key, a process for authenticating the identity of a terminal user provided with an identification number and a secret password comprising the steps of:

provide said terminal user identification number at said terminal, providing said password at said terminal, performing an operation at said terminal in accordance with said terminal user identification number and said password to obtain a terminal user authentication pattern, transferring said terminal user identification number and said authentication pattern from said terminal to said host data processing system, providing a predetermined number at said host data processing system, performing a first operation at said host data processing system in accordance with said predetermined number and said terminal user identification number to obtain a terminal user first verification pattern, providing a predetermined terminal user test pattern at said host data processing system, performing a second operation at said host data processing system in accordance with said terminal user test pattern and said terminal user authentication pattern to obtain a terminal user second verification pattern, and comparing said first verification pattern with said second verification pattern to authenticate the identity of said terminal user.

2. In the process as defined in claim 1 wherein said predetermined terminal user test pattern is provided by an operation which includes the step of:

performing an irreversible cryptographic operation which is a function of said terminal user authentication pattern and said terminal user first verification pattern.

3. In the process as defined in claim 2 wherein providing said predetermined terminal user test pattern further includes the step of:

providing a physical key operated security lock operable by an authorized person for enabling said cryptographic function.

4. In the process as defined in claim 1 wherein the operation performed at said terminal includes the steps of:

providing the terminal user password as a cryptographic key, and enciphering said terminal user identification number under control of said password cryptographic key to obtain said terminal user authentication pattern.

5. In the process as defined in claim 1 wherein said terminal user identification number and said authentication pattern are transferred from said terminal to said host data processing system in encrypted form.

6. In the process as defined in claim 1 wherein the transferring of said terminal user identification number and said authentication pattern includes the steps of:

providing an operational key enciphered under the terminal master key of said terminal, performing a cryptographic operation at said terminal in accordance with said terminal enciphered operational key and said terminal user identification number and authentication pattern to obtain said terminal user identification number and said authentication pattern enciphered under said operational key, providing an operational key enciphered under the host master key of said host data processing system, said operational key at said terminal and said host data processing system being a common operational key, and performing a cryptographic operation at said host data processing system in accordance with said host enciphered operational key and said enciphered terminal user identification number and authentication pattern to obtain said terminal user identification number and authentication pattern in clear form.

7. In the process as defined in claim 6 wherein the cryptographic operation performed at said terminal includes the steps of:

deciphering said enciphered operational key under control of said terminal master key to obtain said operational key in clear form, and enciphering said terminal user identification number and said authorization pattern under control of said operational key to obtain said terminal user identification number and said authorization pattern enciphered under said operational key.

8. In the process as defined in claim 6 wherein the cryptographic operation performed at said host data processing system includes the steps of:

deciphering said enciphered operational key under control of said host master key to obtain said operational key in clear form, and deciphering said enciphered terminal user identification number and said authorization pattern under control of said operational key to obtain said terminal user identification number and said authorization pattern in clear form.

9. In the process as defined in claim 1 wherein said predetermined number is a constant.

10. In the process as defined in claim 4 wherein said constant has a value of zero.

11. In the process as defined in claim 1 wherein said first operation performed at said host data processing system includes the steps of:

performing a cryptographic operation to obtain said terminal user identification number as a cryptographic key, and enciphering said predetermined number under control of said identification cryptographic key to obtain said terminal user first verification pattern.

12. In the process as defined in claim 1 wherein the first operation performed at said host data processing system includes the steps of:

enciphering said terminal user identification number under control of said host master key to obtain an enciphered terminal user identification number, deciphering said enciphered terminal user identification number under control of said host master key to obtain said terminal user identification number as a cryptographic key, and enciphering said predetermined number under control of said identification number cryptographic key to obtain said terminal user first verification pattern.

13. In the process as defined in claim 1 wherein said second operation performed at said host data processing system comprises the steps of:

carrying out an irreversible cryptographic operation which is a function of said terminal user test pattern and said terminal user authentication pattern to obtain said terminal user second verification pattern.

14. In the process as defined in claim 1 wherein the second operation performed by said host data processing system includes the steps of:

providing a variant of said host master key, deciphering said terminal user authentication pattern under control of said variant of said host master key to obtain an operational key, and enciphering said terminal user test pattern under control of said operational key to obtain said terminal user second verification pattern.

15. In the process as defined in claim 1 wherein providing said predetermined terminal user test pattern at said host data processing system includes the host initialization steps of:

providing said terminal user identification number at said host data processing system, providing said password at said host data processing system, performing a first initialization operation at said host data processing system in accordance with said terminal user identification number and said password to obtain said terminal user authentication pattern, performing a second initialization operation at said host data processing system in accordance with said predetermined number and said terminal user identification number to obtain said terminal user first verification pattern, and performing a third initialization operation at said host data processing system in accordance with said terminal user authentication pattern and said terminal user first verification pattern to obtain said terminal user test pattern.

16. In the process as defined in claim 15 wherein said first initialization operation includes the steps of:

performing a cryptographic operation to obtain said terminal user password as a cryptographic key, and enciphering said terminal user identification number under control of said password cryptographic key to obtain said terminal user authentication pattern.

17. In the process as defined in claim 15 wherein said first initialization operation includes the steps of:

enciphering said terminal user password under control of said host master key to obtain an enciphered terminal user password, deciphering said enciphered terminal user password under control of said host master key to obtain said terminal user password as a cryptographic key, and enciphering said terminal user identification number under control of said password cryptographic key to obtain said terminal user authentication pattern.

18. In the process as defined in claim 15 wherein said second initialization operation includes the steps of:

performing a cryptographic operation to obtain said terminal user identification number as a cryptographic key, and enciphering said predetermined number under control of said identification number cryptographic key to obtain said terminal user first verification pattern.

19. In the process as defined in claim 15 wherein said second initialization operation includes the steps of:

enciphering said terminal user identification number under control of said host master key to obtain an enciphered terminal user identification number, deciphering said enciphered terminal user identification number under control of said host master key to obtain said terminal user identification number as a cryptographic key, and enciphering said predetermined number under control of said identification number cryptographic key to obtain said terminal user first verification pattern.

20. In the process as defined in claim 15 wherein said third initialization operation performed at said host data processing system comprises the step of:

carrying out an irreversible cryptographic operation which is a function of said terminal user first verification pattern and said terminal user authentication pattern to obtain said terminal user test pattern.

21. In the process as defined in claim 15 wherein said third initialization operation includes the steps of:

providing a variant of said host master key, deciphering said terminal user authentication pattern under control of said variant of said host master key to obtain an operational key, and deciphering said terminal user first verification pattern under control of said operational key to obtain said terminal user test pattern.

22. In the process as defined in claim 21 wherein said third initialization operation further includes the step of:

providing a physical key operated security lock operable by an authorized person for enabling said deciphering of said enciphered terminal user first verification pattern.

23. In a system providing data communication between a terminal and a host data processing system each having cryptographic apparatus for cryptographic data communications, a process for authenticating the identity of a terminal user provided with an identification number and a secret password comprising the steps of:

providing said terminal user identification number at said terminal, providing said password at said terminal, performing an operation at said terminal in accordance with said terminal user identification number and said password to obtain a terminal user authentication pattern, transferring said terminal user identification number and said authentication pattern from said terminal to said host data processing system, providing a predetermined number at said host data processing system, performing a first operation at said host data processing system in accordance with said predetermined number and said terminal user identification number to obtain a terminal user first verification pattern, providing a table of predetermined terminal user test patterns at said host data processing system, each said terminal user test pattern being a cryptographic function of said terminal user authentication pattern and said terminal user first verification pattern, accessing said table of predetermined terminal user test patterns in accordance with said terminal user identification number to provide a terminal user test pattern corresponding to said terminal user, performing a second operation at said host data processing system in accordance with said accessed terminal user test pattern and said terminal user authentication pattern to obtain a terminal user second verification pattern, and comparing said first verification pattern with said second verification pattern to authenticate the identity of said terminal user.

24. In the process as defined in claim 22 wherein providing said table of predetermined terminal user test patterns at said host data processing system includes the host initialization steps of:

providing said terminal user identification numbers at said host data processing system, providing said passwords at said host data processing system, performing a first initialization operation at said host data processing system in accordance with said terminal user identification numbers and said passwords to obtain terminal user authentication patterns, performing a second initialization operation at said host data processing system in accordance with said predetermined number and said terminal user identification numbers to obtain terminal user first verification patterns, and performing a third initialization operation at said host data processing system in accordance with said terminal user authentication patterns and said terminal user first verification patterns to obtain said table of terminal user test patterns.

* * * * *